United States Patent
Venkatesh et al.

(10) Patent No.: US 10,289,752 B2
(45) Date of Patent: May 14, 2019

(54) ACCELERATOR FOR GATHER-UPDATE-SCATTER OPERATIONS INCLUDING A CONTENT-ADDRESSABLE MEMORY (CAM) AND CAM CONTROLLER

(71) Applicant: Intel Corporation, Santa Clara, CA (US)

(72) Inventors: Ganesh Venkatesh, Portland, OR (US); Nicholas P. Carter, Somerville, MA (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 15/376,172

(22) Filed: Dec. 12, 2016

(65) Prior Publication Data

US 2018/0165381 A1    Jun. 14, 2018

(51) Int. Cl.
*G06F 17/30* (2006.01)
*G06F 9/30* (2018.01)

(52) U.S. Cl.
CPC .... *G06F 17/30982* (2013.01); *G06F 9/30036* (2013.01)

(58) Field of Classification Search
CPC .......... G06F 17/30982; G06F 9/30036; G06F 9/30043; G06F 9/3885
See application file for complete search history.

(56) References Cited

U.S. PATENT DOCUMENTS

| | | | |
|---|---|---|---|
| 2007/0186036 A1 * | 8/2007 | Bittner, Jr. ............. | G11C 15/00 711/108 |
| 2009/0207838 A1 * | 8/2009 | Milliken ................. | G06F 15/16 370/389 |
| 2015/0006808 A1 * | 1/2015 | Miller .................... | G11C 15/00 711/108 |
| 2017/0185403 A1 * | 6/2017 | Anderson ............. | G06F 9/3005 |

FOREIGN PATENT DOCUMENTS

WO    WO-2016126472 A1 *    8/2016    ............... G11C 7/06

* cited by examiner

*Primary Examiner* — Glenn Gossage
(74) *Attorney, Agent, or Firm* — Alliance IP, LLC

(57) ABSTRACT

A processor may include a gather-update-scatter accelerator, and an allocator comprising circuitry to direct an instruction to the accelerator for execution. The instruction may include a search index, an operation to be performed, and a scalar data value. The accelerator may include a content-addressable memory (CAM) storing multiple entries, each of which stores a respective index key and a data value associated with the index key. The accelerator may include a CAM controller, which includes circuitry. The CAM controller may be configured to select, based on the information in the instruction, one of the plurality of entries in the CAM on which to operate. The CAM controller may be configured to perform an arithmetic or logical operation on the selected entry dependent on the information in the instruction. The CAM controller may be configured to store a result of the operation in the selected entry in the CAM.

20 Claims, 19 Drawing Sheets

ACCELERATOR FOR GATHER-UPDATE-SCATTER OPERATIONS INCLUDING A CONTENT-ADDRESSABLE MEMORY (CAM) AND CAM CONTROLLER

FIELD OF THE INVENTION

The present disclosure pertains to the field of processing logic, microprocessors, and an associated instruction set architecture that, when executed by a processor or other processing logic, performs logical, mathematical, or other functional operations such as, for example, gather-update-scatter operations.

DESCRIPTION OF RELATED ART

Multiprocessor systems are becoming more and more common. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native for execution on the processor. Each processor may include a cache or multiple caches. Processors may be implemented in a system on chip (SoC).

DESCRIPTION OF THE FIGURES

Various embodiments of the present disclosure are illustrated by way of example and not limitation in the Figures of the accompanying drawings, in which like references indicate similar elements, and in which.

DETAILED DESCRIPTION

Figure 1A:
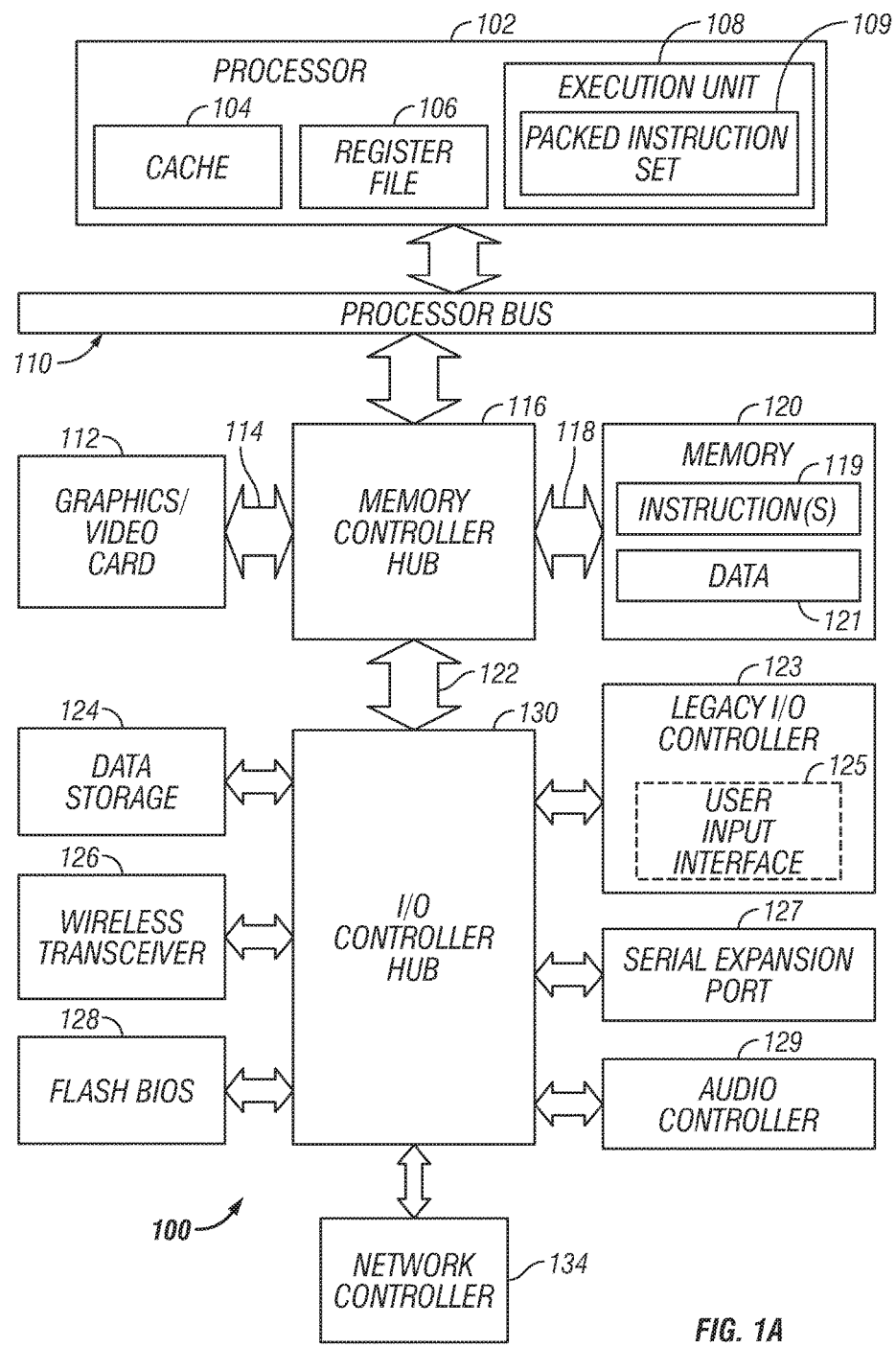
FIG. 1A is a block diagram of an exemplary computer system formed with a processor that may include execution units to execute an instruction, in accordance with some embodiments of the present disclosure.

The following description describes instructions and processing logic for accelerating the execution of gather-update-scatter type operations in a processing apparatus. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that other embodiments may be practiced without such specific details. Additionally, some well-known structures, circuits, and the like have not been shown in detail to avoid unnecessarily obscuring the example embodiments of the present disclosure included herein.

References in the specification to "one embodiment," "an embodiment," "an example embodiment," etc., indicate that the embodiment described may include a particular feature, structure, or characteristic. However, not all embodiments of the present disclosure necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such a feature, structure, or characteristic in connection with other embodiments of the disclosure, whether or not such a connection is explicitly described.

Although some example embodiments are described with reference to a processor, other embodiments may be applicable to other types of integrated circuits and logic devices. Similar techniques and teachings of various embodiments of the present disclosure may be applied to other types of circuits or semiconductor devices that may benefit from higher pipeline throughput and improved performance. The teachings of the example embodiments of the present disclosure may be applicable to any processor or machine that performs data manipulations. However, other embodiments are not limited to processors or machines that perform 512-bit, 256-bit, 128-bit, 64-bit, 32-bit, or 16-bit data operations and may be applied to a processor or machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the examples below describe instruction handling and distribution in the context of execution units and logic circuits, other embodiments of the present disclosure may be accomplished by way of data or instructions stored on a machine-readable, tangible medium, which when executed by a machine cause the machine to perform functions in accordance with at least one embodiment of the disclosure. In some embodiments, functions described in the present disclosure may be embodied in machine-executable instructions. The instructions may be used to cause a general-purpose or special-purpose processor that may be programmed with the instructions to perform the operations of the present disclosure. Some embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of some embodiments of the present disclosure might be performed by specific hardware components that contain fixed-function logic for performing the operations, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program logic to perform some embodiments of the present disclosure may be stored within a memory in the system, such as dynamic random access memory (DRAM), cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS™, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., two-dimensional (2D)/three-dimensional (3D) graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may be a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS™ processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination register.

FIG. 1A is a block diagram of an exemplary computer system formed with a processor that may include execution units to execute an instruction, in accordance with some embodiments of the present disclosure. System 100 may include a component, such as a processor 102, to employ execution units including logic to perform algorithms for processing data, in accordance with the present disclosure, such as in the example embodiments described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including personal computers (PCs) having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX® and Linux for example), embedded software, and/or graphical user interfaces, may also be used. Thus, embodiments of the present disclosure are not limited to any specific combination of hardware circuitry and software.

Embodiments of the present disclosure are not limited to computer systems. Some embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip (SoC), network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer registers.

Execution unit 108, including logic to perform integer and floating point operations, also resides in processor 102. Processor 102 may also include a microcode (ucode) ROM (not shown) that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Some embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instruction(s) 119 and/or data 121 represented by data signals that may be executed by processor 102.

A system logic chip, such as a memory controller hub (MCH) 116, may be coupled to processor bus 110 and memory 120. Processor 102 may communicate with MCH 116 via a processor bus 110. MCH 116 may provide a high bandwidth memory interface 118 to memory 120 for storage of instruction(s) 119 and data 121 and for storage of graphics commands, data and textures. MCH 116 may direct data signals between processor 102, memory 120, and other components in system 100 and bridge the data signals between processor bus 110, memory 120, and system I/O interface bus 122. In some embodiments, the MCH 116 may provide a graphics port for coupling to a graphics/video card 112. MCH 116 may be coupled to memory 120 through a memory interface 118. Graphics/video card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, MCH 116, and processor 102. Examples may include the audio controller 129, firmware hub (flash basic input output system (BIOS)) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a compact disc-read only memory (CD-ROM) device, a flash memory device, or other mass storage device.

In another example system, an instruction in accordance with one embodiment may be used with a system on a chip (SoC). One embodiment of a system on a chip comprises a processor and a memory. The memory for one such system may include a flash memory. The flash memory may be located on the same die as the processor and other system components. Additionally, other logic blocks such as a memory controller or graphics controller may also be located on a system on a chip.

Figure 1B:
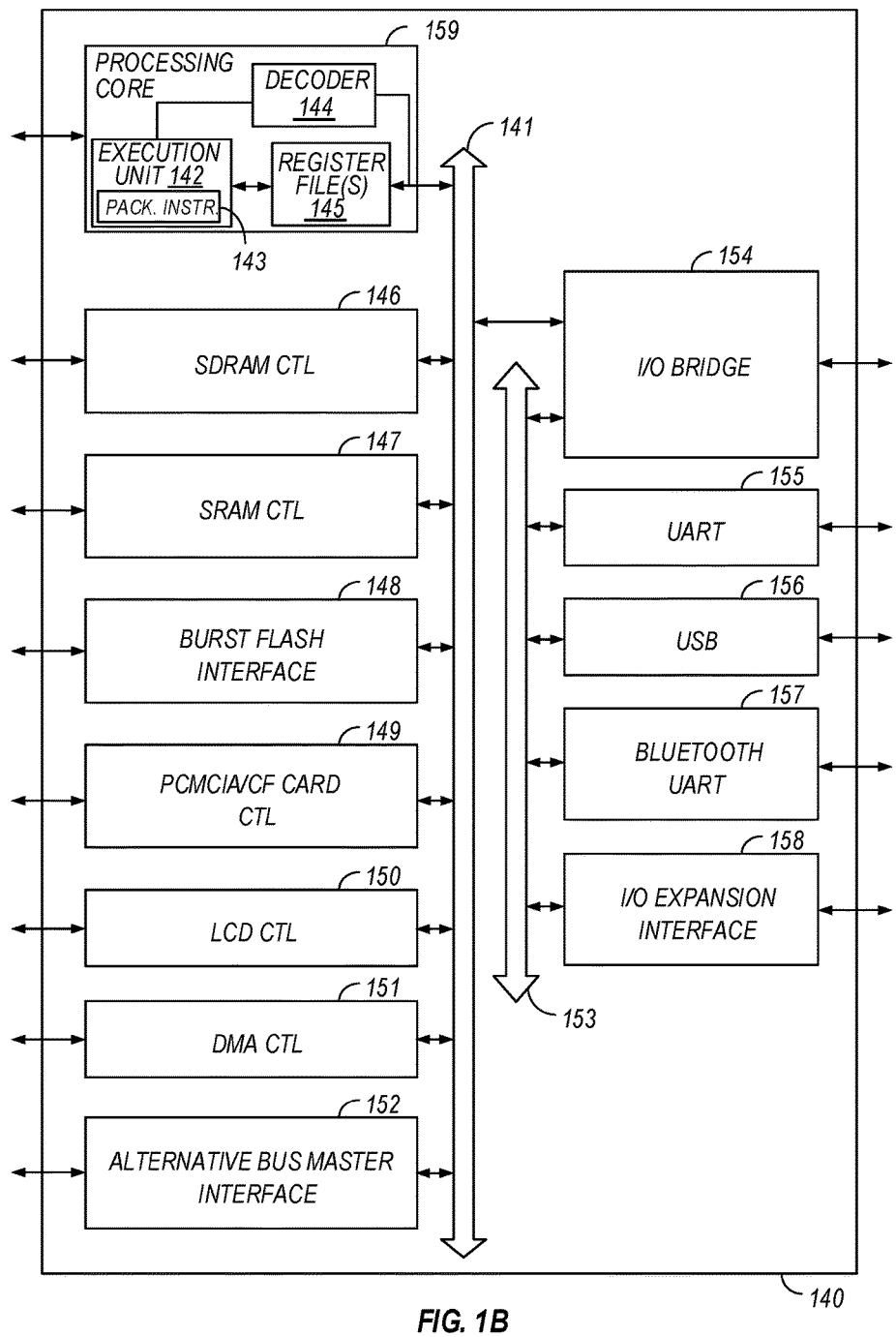
FIG. 1B illustrates a data processing system, in accordance with some embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and, by being represented on a machine-readable media in sufficient detail, may be suitable to facilitate the manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. The storage area may store packed data that might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF®) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth® wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
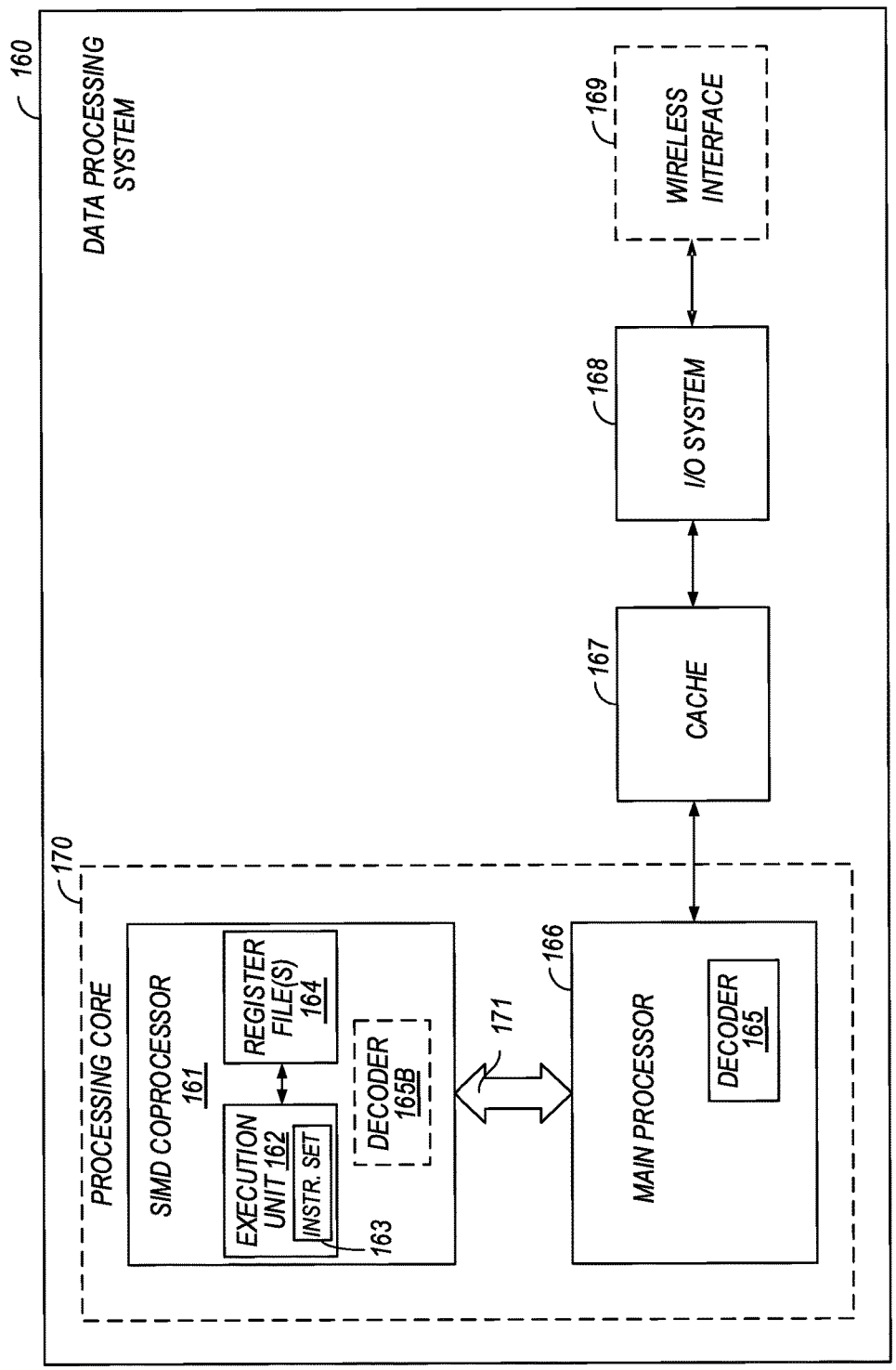
FIG. 1C illustrates yet another embodiment of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations, including executing instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
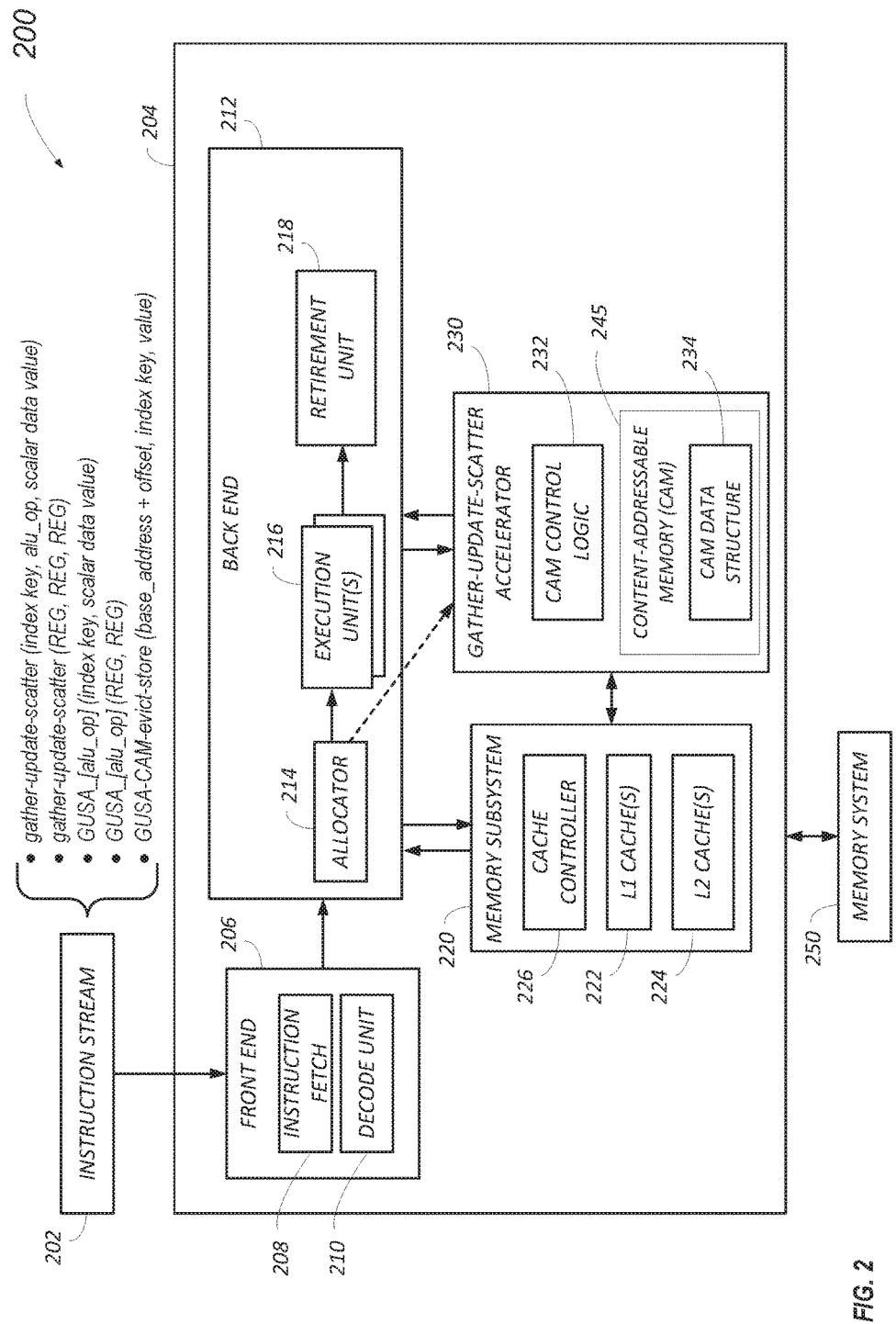
FIG. 2 is a block diagram illustrating an example system to accelerate the execution of gather-update-scatter type operations, according to some embodiments of the present disclosure.

Embodiments of the present disclosure involve instructions, a hardware content-addressable memory (CAM) for storing content-associative data, and processing logic for accelerating the execution of gather-update-scatter type operations. For example, the system may provide a CAM-based approach to accelerate the gradient update step in linear classifiers. FIG. 2 is an illustration of an example system 200 to accelerate the execution of gather-update-scatter type operations. System 200 may include a processor, SoC, integrated circuit, or other mechanism. For example, system 200 may include a processor core 204. Although processor core 204 is shown and described as an example in FIG. 2, any suitable mechanism may be used. Processor core 204 may include any suitable mechanisms for accelerating the execution of gather-update-scatter type operations. In one embodiment, such mechanisms may be implemented in hardware. Processor core 204 may be implemented fully or in part by the elements described in FIGS. 1A-1C or in FIGS. 9A-16.

Instructions to be executed on processor core 204 may be included in instruction stream 202. Instruction stream 202 may be generated by, for example, a compiler, just-in-time interpreter, or other suitable mechanism (which might or might not be included in system 200), or may be designated by a drafter of code resulting in instruction stream 202. For example, a compiler may take application code and generate executable code in the form of instruction stream 202. Instructions may be received by processor core 204 from instruction stream 202. Instruction stream 202 may be loaded to processor core 204 in any suitable manner. For example, instructions to be executed by processor core 204 may be loaded from storage, from other machines, or from other memory, such as memory system 250. The instructions may arrive and be available in resident memory, such as RAM, and may be fetched from storage to be executed by processor core 204. The instructions may be fetched from resident memory by, for example, a prefetcher or fetch unit (such as instruction fetch unit 208). As illustrated in FIG. 2, in some embodiments, instruction stream 202 may include an instruction to cause the processor core 204 to perform a gather-update-scatter instruction, as defined in any suitable instruction format, or an instruction to cause the processor core 204 to evict a key-value pair from an entry in a CAM of a gather-update-scatter accelerator and store a new key-value pair in its place.

Processor core 204 may include a front end 206 and a back end 212. Front end 206 may include an instruction fetch pipeline stage (such as instruction fetch unit 208) and a decode pipeline stage (such as decode unit 210). Front end 206 may receive and decode instructions from instruction stream 202 using decode unit 210. The decoded instructions may be dispatched, allocated, and scheduled for execution by an allocation stage of back end 212 (such as allocator 214) and may be allocated to specific execution units 216 within back end 212 or to gather-update-scatter accelerator 230 for execution. One or more specific instructions to be executed by processor core 204 may be included in a library defined for execution by processor core 204. In some embodiments, specific instructions may be targeted by particular portions of processor core 204. For example, processor core 204 may recognize an attempt in instruction stream 202 to execute a vector operation in software and may issue the instruction to a particular one of execution units 216 to execute the instruction. In another embodiment, processor core 204 may recognize an attempt in instruction stream 202 to execute a gather-update-scatter instruction and may issue the instruction to gather-update-scatter accelerator 230 to execute the instruction.

In one embodiment, system 200 may include a memory hierarchy comprising one or more levels of caches within the cores, one or more shared cache units, and/or external memory coupled to a set of integrated memory controller units (not shown). The caches on each level within the memory hierarchy may include any suitable caches. Some embodiments of the present disclosure may include a single internal cache for both instructions and data, such as, for example, a Level 1 (L1) internal cache, or multiple levels of internal cache. Other embodiments may include separate instruction and data cache units and a shared mid-level cache, such as a Level 2 (L2) cache unit. In some embodiments, the system may include a combination of an internal cache and an external cache that may be external to the core and/or the processor. For example, a last-level cache (LLC) may reside in a system agent, such as the uncore module of processors from Intel®, Inc., in some embodiments (not shown). In other embodiments, all of the caches may be external to the core and/or the processor.

In the example system 200 illustrated in FIG. 2, memory subsystem 220 may include memory, RAM, or a cache hierarchy, which may include one or more Level 1 (L1) caches 222. In one embodiment, L1 caches 222 may be the closest elements of the memory hierarchy to the execution units 216. Therefore, accesses to the L1 caches 222 may experience the shortest latency compared to accesses to other levels in the memory hierarchy. In one embodiment, the L1 caches 222 may be smaller than the caches at other levels in the memory hierarchy. Memory subsystem 220 may also include, for example, a mid-level cache. In one embodiment, a mid-level cache may include one or more Level 2 (L2) caches 224. One or more L2 caches 224 may be shared by multiple processor cores 204. In another embodiment, a mid-level cache may include one or more caches on each of multiple levels in the cache hierarchy, such as level 2 (L2), level 3 (L3), level 4 (L4), or other levels of cache. In one embodiment, the caches of a mid-level cache, such as L2 caches 224, may be farther from the execution units 216 than the L1 caches 222, but closer to the execution units 216 than a last-level cache (not shown). Therefore, accesses to the caches of the L2 caches 224 may experience a longer latency than accesses to the L1 caches 222. In one embodiment, the L2 caches 224 may be larger than the L1 caches 222, but may be smaller than a last-level cache (not shown). In one embodiment, a local L2 cache 224 may include 256 Kbytes in four to six banks with two ports per bank. In one embodiment, accesses to a last-level cache may experience a longer latency than accesses to other levels of the cache hierarchy.

Memory subsystem 220 may also include a cache controller 226. Cache controller 226 may control the assignment of various L1 caches 222 and L2 caches 224 for the use of execution units 216 within back end 212. In at least some embodiments, cache controller 226 may include hardware circuitry or logic to control the insertion of cache lines into the L1 caches 222 and L2 caches 224 and the eviction of cache lines from the L1 caches 222 and L2 caches 224 in accordance with one or more cache replacement policies for the caches.

During execution, access to data or additional instructions (including data or instructions resident in memory system 250) may be made through memory subsystem 220. Moreover, results from execution may be stored in memory subsystem 220 and may subsequently be flushed to memory system 250. After execution by execution units 216 or gather-update-scatter accelerator 230, instructions may be retired by a writeback stage or retirement stage in retirement unit 218 within back end 212. Various portions of such execution pipelining may be performed by one or more processor cores 204.

Many machine learning workloads, such as linear classifiers, are heavy users of gather-update-scatter type operations in which gathers are almost immediately followed by scatters to the same addresses, with only a potential modification of the gathered data in between. In general, the term "gather" may refer to an operation in which one or more indices are loaded from an array of indices and elements are obtained ("gathered") from locations in memory based on those indices. The term "scatter" may refer to an opposite operation, in which one or more indices are loaded from an array of indices and elements are stored ("scattered") to random locations or to locations in memory based on those indices. These gather and scatter operations achieve poor performance on existing systems because they exhibit poor spatial locality and most caches only allow one or two accesses per cycle. Thus, these scatter operations and gather operations may increase cache pressure in these systems.

In some existing systems, the use of extended vector instructions may provide performance improvements if there is spatial locality amongst the entries gathered. However, they are not explicitly optimized for the gather-update-scatter patterns that are found in machine learning applications operating on real-world datasets that have little spatial locality, such as n-gram models. For example, some such approaches involve attempts to map multiple gather, update, or scatter operations to single instruction multiple data (SIMD) arithmetic operations in order to explore instruction level parallelism. These approaches depend on the ability to identify the matching index keys, which may introduce significant cache pressure. In some cases, these approaches may incur relatively high rates of branch mispredictions, which may be incompatible with SIMD.

In at least some embodiments, the systems and processors described herein may include a content-addressable memory (CAM) to support gather-update-scatter type operations. For example, a processor may include a CAM-based accelerator for gather-update-scatter type operations. The CAM may be heavily banked for parallelism, in some embodiments. For example, with banking in the CAM, the accelerator may be able to perform four, eight, or even twelve gather-update-scatter type operations per cycle, irrespective of the spatial locality of the address stream. In some embodiments, the CAM, or a specific data structure stored in the CAM, may store only 32-bit to 64-bit values to address the low spatial locality aspect of gather and scatter operations. In some embodiments, the CAM, or a specific data structure stored in the CAM, may replace a traditional cache address look-up with an index-based addressing scheme, which reduces the amount of work required for look-up. For example, in at least some embodiments, no TLB accesses are required when using this approach.

In embodiments of the present disclosure, system 200 may include hardware support to accelerate these gather-update-scatter operations and thus to speed up processing of machine learning applications. For example, in one embodiment, system 200 may include a gather-update-scatter accelerator (GUSA) that provides key-based associative search functionality. As described in more detail below, the GUSA may include logic and/or circuitry to execute one or more gather-update-scatter operations efficiently.

As illustrated in FIG. 2, in one embodiment, system 200 may include a gather-update-scatter accelerator (GUSA) 230 to execute one or more gather-update-scatter operations. GUSA 230 may be implemented in any suitable manner. System 200 may include a GUSA 230 in any suitable portion of system 200. In one embodiment, system 200 may include GUSA 230 that is implemented as a stand-alone circuit within processor core 204. In another embodiment, system 200 may include GUSA 230 that is implemented as a component of one or more execution units 216 or as a component of another element of an execution pipeline in processor core 204. In yet another embodiment, system 200 may include a GUSA 230 that is implemented outside of processor core 204 within system 200 and is communicatively coupled to processor core 204. GUSA 230 may be implemented by any suitable combination of circuitry or hardware computational logic, in different embodiments. In one embodiment, GUSA 230 may accept inputs from other portions of system 200 and return results of one or more gather-update-scatter operations.

In one embodiment, GUSA 230 may include or may be communicatively coupled to memory elements to store information necessary to perform one or more gather-update-scatter operations. For example, GUSA 230 may include a content-addressable memory, shown as CAM 245. The CAM 245 may store a content-associative data structure (shown as CAM data structure 234) in which sets of key-value pairs may be stored. In various embodiments, CAM data structure 234 may be a 4 KB CAM data structure that includes 128 to 512 entries, depending on their sizes. In some embodiments, CAM data structure 234 may be implemented as banked memory. For example, CAM data structure 234 may include four to eight banks, with two ports per bank.

In one embodiment, CAM data structure 234 may be implemented in CAM 245 within GUSA 230. In another embodiment, CAM data structure 234 may be implemented within any suitable memory within system 200. In one embodiment, GUSA 230 may be implemented by circuitry including CAM control logic 232, which may control access to and perform operations on the contents of CAM 245 and/or CAM data structure 234. In at least some embodiments, CAM control logic 232 may support read operations, write operations, and update-in-place operations that are directed to particular entries within CAM 245 and/or CAM data structure 234. For example, in one embodiment, GUSA 230 may include circuitry to perform arithmetic or logic operations that modify key-value pairs resident in CAM data structure 234. In another embodiment, GUSA 230 may include circuitry to store key-value pairs on which arithmetic or logic operations have been performed in CAM data structure 234. In one embodiment, GUSA 230 may include circuitry to evict some or all of the contents of CAM data structure 234 to memory (e.g., to evict one or more entries containing key-value pairs to memory subsystem 220 and/or memory system 250).

Processor core 204 may recognize, either implicitly or through decoding and execution of specific instructions, that a gather-update-scatter operation is to be performed. In such cases, the performance of the gather-update-scatter operation may be offloaded to GUSA 230. In one embodiment, GUSA 230 may be targeted by one or more specific instructions in instruction stream 202. Such specific instructions may be generated by, for example, a compiler, just-in-time interpreter, or other suitable mechanism (which may or may not be included in system 200), or may be designated by a drafter of code resulting in instruction stream 202. Note that instruction stream 202 may include instructions other than those that perform gather-update-scatter operations.

In one embodiment, the specific instructions for performing gather-update-scatter operations that target the contents of a content-associative data structure such as CAM data structure 234 may include an instruction to perform a gather-update-scatter instruction, as defined in any suitable instruction format, or an instruction to cause the processor core 204 to evict a key-value pair from an entry in CAM data structure 234 of gather-update-scatter accelerator 230 and store a new key-value pair in its place. In various embodiments, gather-update-scatter accelerator 230 may include an arithmetic logic unit (ALU), which may include circuitry and logic to perform any of a variety of arithmetic or logic operations that take a data value of an entry in CAM data structure 234 and a scalar data value as its input operands.

In some embodiments, the ISA may include a single gather-update-scatter instruction in which the ALU operation to be performed is defined by one of the input parameters of the instruction. In such embodiments, a specific gather-update-scatter instruction may be defined by three input parameters of the single gather-update-scatter instruction: a value representing an index key for a particular entry in the CAM data structure (the data value of which will serve as an operand for a particular arithmetic or logic operation), a value identifying the particular arithmetic or logic operation to be performed, and a scalar data value to serve as another operand for the operation. In another embodiment, a specific gather-update-scatter instruction may be defined by three input parameters of the single gather-update-scatter instruction: an identifier of a register that stores an index key for a particular entry in the CAM data structure (the data value of which will serve as an operand for a particular arithmetic or logic operation), an identifier of a register that stores a value identifying the particular arithmetic or logic operation to be performed, and an identifier of a register that stores a scalar data value to serve as another operand for the operation.

In some embodiments, the ISA may include separate gather-update-scatter type instructions to be executed by gather-update-scatter accelerator 230 for some or all of the different arithmetic or logic operations supported by gather-update-scatter accelerator 230. For example, in one embodiment, the ISA may include separate "GUSA_ADD", "GUSA_MULTIPLY", "GUSA_AND", "GUSA_OR", and/or "GUSA_XOR" instructions, among others. Each of these instructions may be implemented by a different opcode in the ISA that implicitly indicates the arithmetic or logic operation to be performed as part of a gather-update-scatter operation. In this case, each of these instructions may include, as input parameters, a value representing an index key for a particular entry in the CAM data structure (or an identifier of a register that stores an index key for a particular entry in the CAM data structure), and a scalar data value to serve as another operand for the operation (or an identifier of a register that stores a scalar data value to serve as another operand for the operation), but may not require an input parameter value identifying the particular arithmetic or logic operation to be performed. In at least some embodiments of the present disclosure, rather than performing three separate macroinstructions to read a value, apply an arithmetic or logic operation to the value that was ready, and write the result back to the same location from which the original value was read, each of these high-bandwidth gather-update-scatter instructions may be executed as a single macroinstruction by gather-update-scatter accelerator 230, which performs all three of these operations.

In one embodiment of the present disclosure, a gather-update-scatter accelerator such as GUSA 230 may be implemented by dedicated circuitry or logic to accelerate the execution of gather-update-scatter operations that are directed to processor core 204. In some embodiments, each thread of a processor core 204 may access a different hardware content-associative data structure, such as CAM data structure 234. In other embodiments, each thread of a processor core 204 may access a different portion of a single CAM data structure 234 that is shared among the threads. In yet another embodiment, system 200 may include a dedicated GUSA 230 (and corresponding CAM 245 and/or CAM data structure 234) for each of multiple threads of a processor core 204. In one embodiment, the portion of a shared CAM data structure 234 that is accessible by each processor core 204, execution unit 216, or thread thereof for storing and operating on key-value pairs may have a fixed size. In another embodiment, the size of the portion of a shared CAM data structure 234 that is accessible by each processor core 204, execution unit 216, or thread thereof for storing and operating on key-value pairs may be dynamically configurable at runtime, based on the workload.

In one embodiment, each thread or core that shares a CAM data structure 234 with one or more other threads or cores may access a respective set of key-value pairs within the CAM data structure 234. In one embodiment, the CAM control logic 232 of the GUSA 230 for a particular processor core 204, execution unit 216, or thread thereof may include circuitry or logic to track the number of key-value pairs that are stored in the shared CAM data structure 234 for each thread. In another embodiment, CAM control logic 232 may include circuitry or logic to generate the correct offsets into the shared CAM data structure 234 to provide access to the respective portion of the shared CAM data structure 234 for each thread. In yet another embodiment, system 200 may include shared CAM control logic 232 (e.g., a shared CAM processing engine) to which multiple processor cores 204, execution units 216, or threads thereof submit requests to perform gather-update-scatter operations. In this example, the shared CAM control logic 232 may access the appropriate CAM data structures 234 (or portions thereof) to execute the requested gather-update-scatter operations on behalf of the requesting processors cores, execution units, or threads.

In one embodiment, CAM data structure 234 may be communicatively coupled to the memory subsystem 220, and the results of the execution of gather-update-scatter operations by GUSA 230 may be stored in memory subsystem 220. In some embodiments, GUSA 230 may be communicatively coupled directly to memory subsystem 220 to provide the results of gather-update-scatter operations executed by GUSA 230. For example, the results of the execution of gather-update-scatter operations by GUSA 230 may be written to any suitable cache within the cache hierarchy of memory subsystem 220, such as an L1 cache 222 or L2 cache 224. The results that are written to the cache hierarchy may subsequently be flushed to memory system 250.

Figure 3:
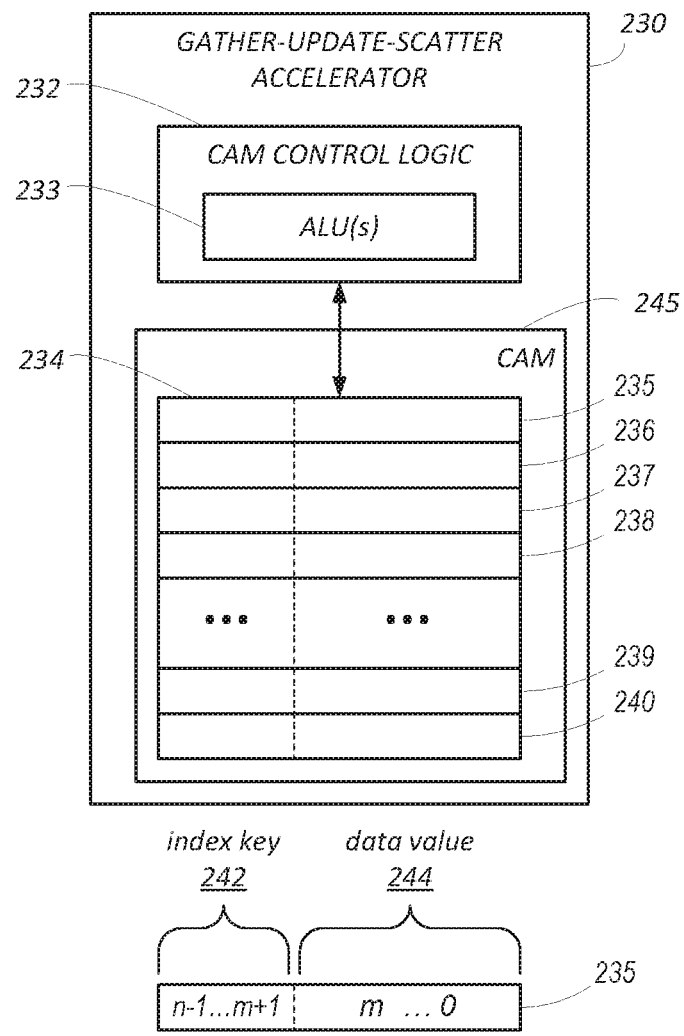
FIG. 3 is a block diagram illustrating a gather-update-scatter accelerator, in accordance with some embodiments of the present disclosure.

FIG. 3 is a block diagram illustrating gather-update-scatter accelerator 230 in more detail, in accordance with some embodiments of the present disclosure. In this example, gather-update-scatter accelerator (GUSA) 230 includes a hardware content-associative data structure (CAM data structure 234) within a CAM 245, and CAM control logic 232 to control access to and perform operations on the contents of CAM data structure 234. In one embodiment, CAM control logic 232 may include one or more gather-update-scatter operations execution units (shown as ALUs 233), each of which includes circuitry for executing all or a portion of one or more gather-update-scatter operations that target CAM data structure 234. For example, one or more of ALUs 233 may include circuitry to perform an arithmetic or logic operation to modify the contents of an entry within CAM data structure 234, to add a new entry to CAM data structure 234 based on results of an arithmetic or logic operation performed on a data value in a key-value pair, or to move one or more entries of CAM data structure 234 to memory.

In one embodiment, CAM data structure 234 may include multiple elements 235-240, each of which may store information representing a key-value pair. Each such element may include n bits, a subset of which are used as an index into CAM data structure 234 to access that element, and another subset of which contain a data value to be retrieved using that index. For example, element 235, which is shown in an expanded form in FIG. 3, includes an index key 242 in bits (n−1) to (m+1), and a data value 244 in bits m to 0. In this example, in order to retrieve the data value 244 stored in bits m to 0 within element 235, the index key 242 stored in bits (n−1) to (m+1) may be presented to CAM data structure 234. The key-value pairs stored in CAM data structure 234 may be encoded in any suitable key-value format, in different embodiments.

In at least some embodiments, the use of the mechanisms described herein for accelerating the execution of gather-update-scatter operations may improve the performance of machine learning applications in which the gather-update-scatter pattern is used to perform model updates using sparse inputs. For example, these applications may include operations that apply an arithmetic or logic operation to a relatively small number of entries in a dense array based on an additional operand provided by a sparse vector (e.g., DenseArray+=SparseVector). In these machine learning applications, the dense array may include a very large number of entries compared to the number of entries in the sparse vector. In one example, the dense array may include one million entries, while the sparse vector (which includes a respective entry only for the particular entries of the dense array on which an update operation is to be performed) may include on the order of twenty entries. In some embodiments, entries within the dense array that are being updated often are likely to be resident in the CAM data structure 234.

One example of a gather-update-scatter pattern that is likely to benefit from the techniques described herein is illustrated by the example pseudo-code below.

```
for(int i = 0; i < n; i++)
    {
        d[s[i]→index] += s[i] → value; // gather-update-scatter
        operation
    }
```

In this example, the index key value in each entry i of the sparse vector s is used to look up the data value at the location in the dense array d that is accessed by that index key. An update operation is then performed on the data value read from the dense array and the data value in the sparse vector that includes that index key value. In this example, the operation is an addition operation, although any arithmetic and/or logic operation(s) may be specified for performing the update. In this example, after adding the two values together, the result of the addition is stored back into the dense array d at the location accessed by the index key value. This is repeated for each entry in the sparse vector.

In at least some embodiments of the present disclosure, each of the n gather-update-scatter operations may be executed as a single gather-update-scatter instruction that is directed to the gather-update-scatter accelerator 230 for execution. For example, some number of <index, value> pairs corresponding to recently or frequently accessed entries of the dense array may be stored in the CAM data structure 234, which supports read, write, and update-in-place operations. The processor core may, over time during execution of the code, build a list of indices for which there are entries in the sparse vector, and may schedule, as gather-update-scatter instructions targeting those entries are received, update operations for the entries in the CAM data structure 234 that include those indices. In at least some embodiments, two or more of these single gather-update-scatter instructions may be executed in parallel by the gather-update-scatter accelerator 230. In some embodiments, this approach may reduce the number of cache look-ups by fifty percent in the ideal case, e.g., in the case that the number of frequently accessed entries is sufficiently small that they are likely to be resident in the CAM data structure 234 when gather-update-scatter instructions targeting those entries are received. In initial analysis of this approach using real-world sparse machine learning datasets has shown that a CAM data structure 234 with 100-200 entries may be sufficient to capture a significant fraction of the gather-update-scatter operations performed in these types of workloads.

In some embodiments, gather-update-scatter accelerator 230 may include storage for a base address value, shown as base address 450 in FIG. 4, discussed below. In some embodiments, every miss in the CAM data structure 234 may result in a load operation for a location addressed as <base_addr+index> to the larger backing cache. In some cases, this may also result in an eviction from the CAM data structure 234, implemented as a store of the previous contents of an entry in the CAM data structure 234 to the cache.

In embodiments of the present disclosure, a system (such as system 200 in FIG. 2) that includes a gather-update-scatter accelerator such as GUSA 230 may support several application programming interfaces (APIs) to perform gather-update-scatter operations. These gather-update-scatter operations may access and operate on a hardware content-associative data structure, such as CAM data structure 234. In some embodiments, the gather-update-scatter operations executed by GUSA 230 may be performed asynchronously. In such embodiments, other instructions may be executed by execution units 216 within processor core 204 at the same time. In one embodiment, each of these APIs may be implemented in hardware as an instruction in the instruction set architecture (ISA) of the processor core 204. In one embodiment, each of the gather-update-scatter operations may be invoked by a machine language or assembly language instruction that is included in a program. In another embodiment, each of the gather-update-scatter operations may be invoked by calling a function or method defined in a high level procedural or object oriented programming language. The programming language may be a compiled or interpreted language, in different embodiments.

In one embodiment, each of the APIs that defines a gather-update-scatter operation may be implemented by one or more micro-instructions or micro-operations that are executed by processor core 204. For example, decode unit 210 may receive an instruction representing a gather-update-scatter operation that is defined by one of the APIs. Decode unit 210 may decode the received instruction into one or more micro-instructions or micro-operations, either of which may be referred to herein as uops, and each of which is to be executed by one of the execution units 216 or by GUSA 230. Allocator 214 may receive the micro-instruction(s) or micro-operation(s) from decode unit 210 and may direct each of them to the appropriate execution unit 216 or GUSA 230 in order to perform the requested gather-update-scatter operation. In one embodiment, GUSA 230 may include circuitry or logic to execute a micro-instruction or micro-operation to load data into CAM data structure 234. In another embodiment, GUSA 230 may include circuitry or logic to execute a micro-instruction or micro-operation to perform an index matching operation on the keys of key-value pairs. In another embodiment, GUSA 230 may include circuitry or logic to execute various micro-instructions or micro-operations to perform arithmetic or logic operations that modify data values within key-value pairs stored in CAM data structure 234 These and other micro-instructions or micro-operations may be executed in various combinations to perform the gather-update-scatter operations defined by the APIs. In one embodiment, two or more of the gather-update-scatter operations may be performed by assembly language instructions that share a single opcode. For example, the opcode may indicate that the instruction is to be directed to (and executed by) GUSA 230. In this example, these assembly language instructions may include multiple control fields whose respective values define the specific gather-update-scatter operation to be performed. One of the control fields may indicate the arithmetic or logic operation to be performed. One of the control fields may indicate the size of the operands for the arithmetic or logic operation to be performed.

Figure 4:
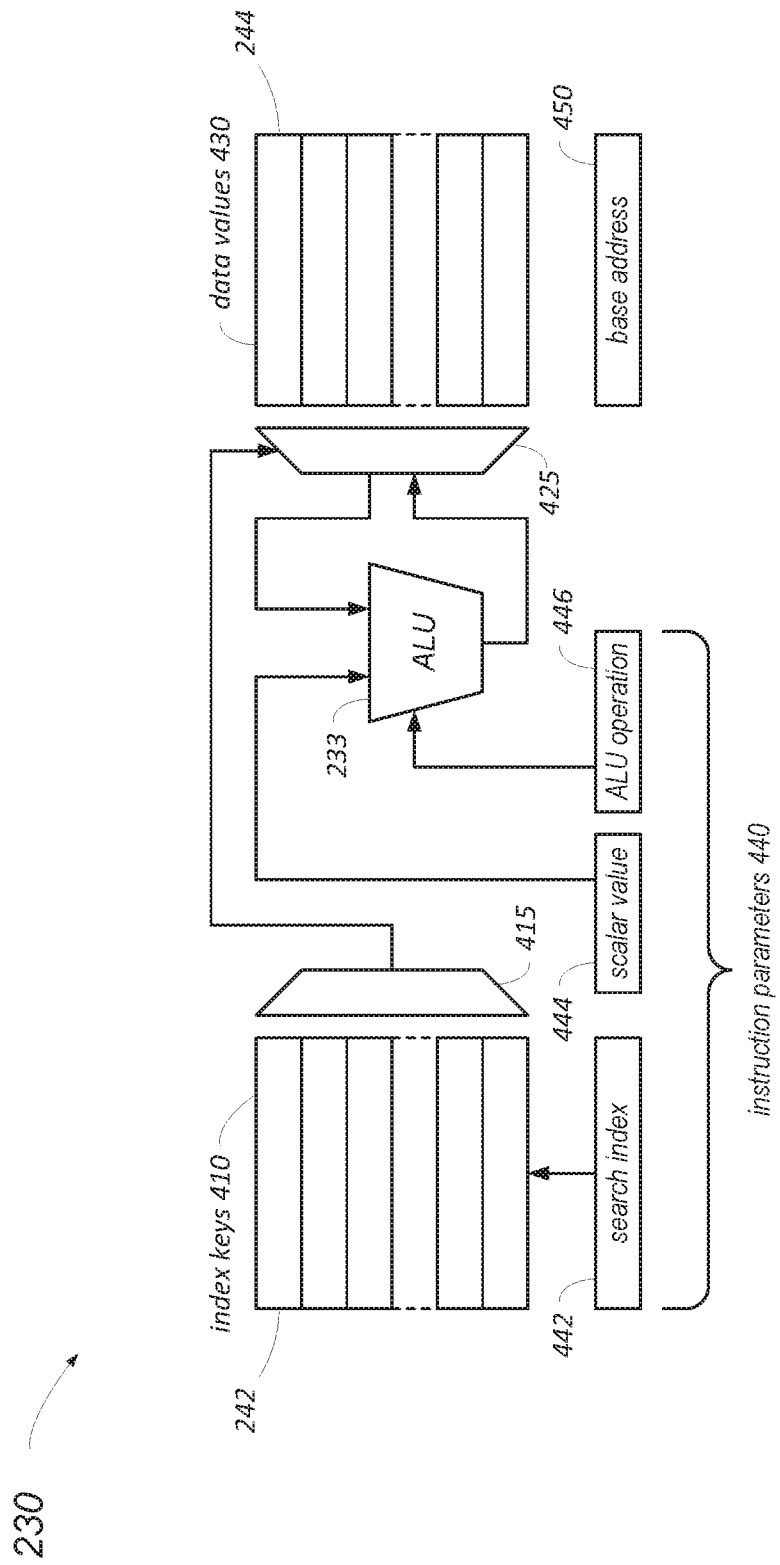
FIG. 4 is a block diagram illustrating selected portions of the gather-update-scatter accelerator illustrated in FIG. 2 in more detail, according to some embodiments of the present disclosure.

FIG. 4 is a block diagram illustrating selected portions of the gather-update-scatter accelerator 230 illustrated in FIG. 2 in more detail, according to some embodiments of the present disclosure. In various embodiments, one or more of the elements depicted in FIG. 4 may be elements of CAM control logic 232. In the example embodiment illustrated in FIG. 4, gather-update-scatter accelerator 230 includes, within a CAM data structure such as CAM data structure 234, storage for multiple index keys (shown as index keys 410) and corresponding data values (shown as data values 430) for key-value pairs stored in the CAM data structure. For example, index key 242 and data value 244 may, collectively, represent a key-value pair stored in the CAM data structure.

In this example, gather-update-scatter accelerator 230 includes an ALU 233. ALU 233 may include hardware circuitry and logic to perform, for a given gather-update-scatter operation, an arithmetic or logic operation specified as part of the instruction parameters 440. For example, instruction parameters 440 may include data identifying an ALU operation, data identifying a location of an ALU operation, or data otherwise representing an ALU operation to be performed by ALU 233 (shown as ALU operation 446). This data may be provided as a control input to ALU 233 to cause it to perform the specified arithmetic or logic operation on its input operands.

In this example embodiment, instruction parameters 440 may include data identifying a given index key value, data identifying a location of a given index key value, or data otherwise representing a given index key value to be used as a search index into the CAM data structure 234 (shown as search index 442). If there is a hit for the search index in the index keys 410, the index key may be output, by multiplexer/demultiplexer 415, and provided as a control input to multiplexer/demultiplexer 425. This input may cause the corresponding data value 430 to be gathered from the entry identified within data values 430 by the search index 442 and provided to ALU 233 as an operand for the arithmetic or logic operation specified as ALU operation 446.

In this example embodiment, instruction parameters 440 may include data identifying a scalar data value, data identifying a location of a scalar data value, or data otherwise representing a scalar data value (shown as scalar value 444). This scalar data value may be provided to ALU 233 as another operand for the specified arithmetic or logic operation. After the specified arithmetic or logic operation is performed by ALU 233, the result of the operation may be provided (as the output of ALU 233) to multiplexer/demultiplexer 425 in order to scatter the result back to the entry identified within data values 430 by the search index 442.

In at least some embodiments, all of the elements of gather-update-scatter accelerator 230 illustrated in FIG. 4 may be local to a particular processor core, such as processor core 204. In some embodiments, the index keys 410 within CAM data structure 234 may include 128 entries, each of which is 32-bits wide. In some embodiments, each of 128 data values 430 within CAM data structure 234, which represent the data values for the key-value pairs that include the index key values 410, may include 32 or 64 bits. As described herein, the gather-update-scatter accelerator 230, and its CAM data structure 234 and CAM control logic 232, may support read operations, write operations, and update-in-place operations that are directed to key-value pairs in the CAM data structure 234.

The gather-update-scatter accelerator 230, and its CAM data structure 234 and CAM control logic 232, may also support an operation to explicitly evict a key-value pair and replace it with another key-value pair. For example, the gather-update-scatter accelerator 230 may include circuitry and logic to implement an operation GUSA-CAM-evict-store, which includes instruction parameters to specify an index key and value for a new key-value pair to be stored in the CAM data structure 234, an offset into the CAM data structure 234 identifying the location of an entry in which a key-value pair is to be replaced, and/or a base address that, in combination with the specified offset, identifies a location in memory to which the key-value pair currently contained in the entry is to be evicted. For example, the value stored in base address 450 may represent a base address for an array in memory storing key-value pairs, a subset of which are stored in CAM data structure 234. In some embodiments, when an entry is evicted from CAM data structure 234, it may be evicted first to a backing cache, such as one of L1 caches 222 or L2 caches 224, after which it may be flushed to main memory at a location computed from the base address and the offset. In the event that a gather-update-scatter operation is presented to gather-update-scatter accelerator 230 for which no entry with an index key matching the specified search key resides in CAM data structure 234, the key-value pair containing the search index may be obtained from the backing cache. In some embodiments, the CAM control logic 232 may be able to perform a CAM access using a 32-bit index search across as many as 512 entries with higher performance than is possible in existing CAMs that require a larger index, such as a 128-bit index. This may allow multiple gather-update-scatter operations to be performed in a single cycle. By banking the CAM entries, parallelism may be increased without greatly impacting efficiency. In embodiments in which the CAM entries are banked, there may be a separate instance of ALU 233 for each bank.

Figure 5:
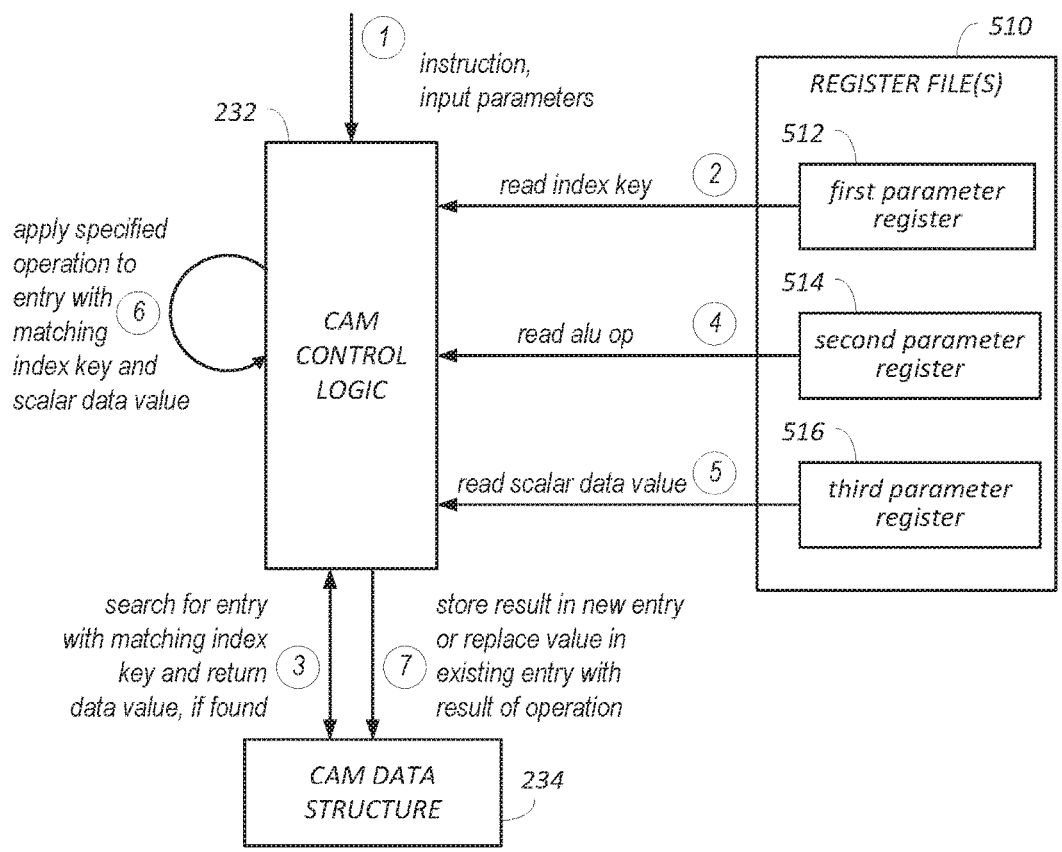
FIG. 5 is an illustration of the performance, by components of a gather-update-scatter accelerator, of a gather-update-scatter operation, in accordance with some embodiments of the present disclosure.

FIG. 5 is an illustration of the performance, by components of a gather-update-scatter accelerator, of a gather-update-scatter operation, in accordance with some embodiments of the present disclosure. In one embodiment, system 200 may execute an instruction to modify a data value of a selected key-value pair resident in CAM data structure 234 by performing a specified arithmetic or logic operation on a key-value pair with an index key matching the index key specified by the instruction. For example, a "gather-update-scatter" type instruction may be executed. This instruction may include any suitable number and kind of operands, bits, flags, parameters, or other elements. In one embodiment, a call of the gather-update-scatter instruction may reference a pointer that identifies a register in which the index key for the operation is stored. The specified index key may be used as a search key to gather a data value of a key-value pair residing in the CAM data structure 234. In embodiments in which the arithmetic or logic operation to be performed is not implicitly specified by the instruction opcode, a call of the gather-update-scatter instruction may reference a pointer that identifies a register in which a scalar data value to serve as an operand for the operation is stored. A call of the gather-update-scatter instruction may also reference a pointer that identifies a register in which data identifying the arithmetic or logic operation to be performed is stored. For example, the parameter value stored in the identified register may specify that the scalar data value is to be added to the data value of the key-value pair having the specified key and that a value representing the sum of these two operands should be stored as an updated data value in the key-value pair in the CAM data structure 234.

In the example embodiment illustrated in FIG. 5, at (1) the gather-update-scatter instruction and its parameters (which may include any or all of the pointers described above) may be received from a processor cores 204 by CAM control logic 232. For example, the gather-update-scatter instruction may be issued to CAM control logic 232 within a gather-update-scatter accelerator 230 (not shown in FIG. 5) by an allocator 214 (not shown in FIG. 5) within the processor core 204, in one embodiment. The gather-update-scatter instruction may be executed logically by CAM control logic 232.

In this example, the key-value pairs residing in CAM data structure 234 may be a subset of the key-value pairs stored in a dense array within memory system 250 (shown in FIG. 2). In some embodiments, execution of the gather-update-scatter instruction by CAM control logic 232 may include, at (2) reading an index key from a location identified by the first pointer referenced in the instruction call. For example, the first pointer may identify a first parameter register 512 in a register file 510 into which a search index key was loaded prior to the instruction call, and CAM control logic 232 may read an index key from that register. In other embodiments, a value representing the search index key may be specified as an input parameter of the instruction. Execution of the gather-update-scatter instruction may include, at (3), CAM control logic 232 searching CAM data structure 234 to determine whether a key-value pair stored in CAM data structure 234 includes the index key that was read from the identified register at (2) or obtained as an input parameter of the instruction. If so, the entry containing the matching index key may be returned to CAM control logic 232. In one embodiment, this may include returning the data value for the key-value pair stored in CAM data structure 234 that has the matching index key.

If at (3), a matching index key is found and the data value for the key-value pair stored in CAM data structure 234 that includes the matching index key is returned, execution of the gather-update-scatter instruction may include obtaining the other instruction parameters for the gather-update-scatter instruction. In some embodiments, at (4), CAM control logic 232 may read data representing an ALU operation from a location identified by the second pointer referenced in the instruction call. For example, the second pointer may identify a second parameter register 514 in the register file 510 into which the data representing the ALU operation was loaded prior to the instruction call, and CAM control logic 232 may read this value from the identified register. In other embodiments, a value representing the ALU operation to be performed may be specified as an input parameter of the instruction, or the ALU operation to be performed may be implicitly specified by the opcode for the instruction. In some embodiments, at (5), CAM control logic 232 may read a scalar data value from a location identified by the third pointer referenced in the instruction call. For example, the third pointer may identify a third parameter register in the register file 510 into which the scalar data value for the ALU operation was loaded prior to the instruction call, and CAM control logic 232 may read this value from the identified register. In other embodiments, the scalar data value for the ALU operation may be specified as an input parameter of the instruction.

In this example, at (6) CAM control logic 232 may apply the specified ALU operation to the data value for the key-value pair stored in CAM data structure 234 that includes the matching index key and to the specified scalar data value. For example, if the ALU operation is an ADD operation, the value of the scalar data value may be added to the data value for the identified key-value pair. In another example, if the ALU operation is an OR operation, a bitwise OR operation may be applied to the two operand values. After the ALU operation is performed, at (7), CAM control logic 232 may replace the data value of the key-value pair stored in CAM data structure 234 that includes the matching index key with a data value that represents the result of the ALU operation. For example, the replacement data value may represent the sum of the two operand values, or may represent the result of an OR operation that was applied to the two operand values, in different embodiments. In some embodiments, key-value pairs may be stored in a sorted order by their keys in CAM data structure 234. In such embodiments, the modified key-value pair, including its original index key and replacement data value, may be stored in CAM data structure 234 in the location at which the original key-value pair that included the matching index key was previously stored in CAM data structure 234.

In some embodiments, if at (3), no entry with a matching index key is found in CAM data structure 234, the operations shown as (4) through (7) may be omitted. In other embodiments, if at (3), no entry with a matching index key is found in CAM data structure 234, a key-value pair that includes the matching index key may be obtained from a cache or from main memory (not shown) after which the operations shown as (4) through (6) may be performed. In this case, at (7), CAM control logic 232 may store a new key-value pair in CAM data structure 234 that includes the matching index key and a data value that represents the result of the ALU operation. In some embodiments, the new key-value pair may be stored in CAM data structure 234 in a location determined by its index key, according to the sorting algorithm used to sort and store all of the key-value pairs stored in CAM data structure 234. In some embodiments, storing a new key-value pair in CAM data structure 234 may necessitate the eviction of a key-value pair currently stored in CAM data structure 234. While in the example illustrated in FIG. 5, the operations shown at (4) and (5) are not performed until after it is determined that a key-value pair containing the matching index key resides in CAM data structure 234, in other embodiments, these operations may be performed before or after the operation shown at (3) regardless of whether or not a key-value pair containing the matching index key is found in CAM data structure 234. In other words, in some embodiments, the operations shown at (4) and (5) might not be dependent on the outcome of the operation shown at (3). However, in the case that no entry with a matching index key is found in CAM data structure 234, the operations shown as (6) and (7) may be omitted.

In one embodiment, any or all of the operations illustrated in FIG. 5 may be repeated for each gather-update-scatter operation in a sequence of such operations. For example, in the case that the values in a sparse vector are used to modify the values in a dense array, the operations illustrated in FIG. 5 may be performed for each key-value pair in CAM data structure 234 for which there is also a value associated with the same key in the sparse vector.

Figure 6:
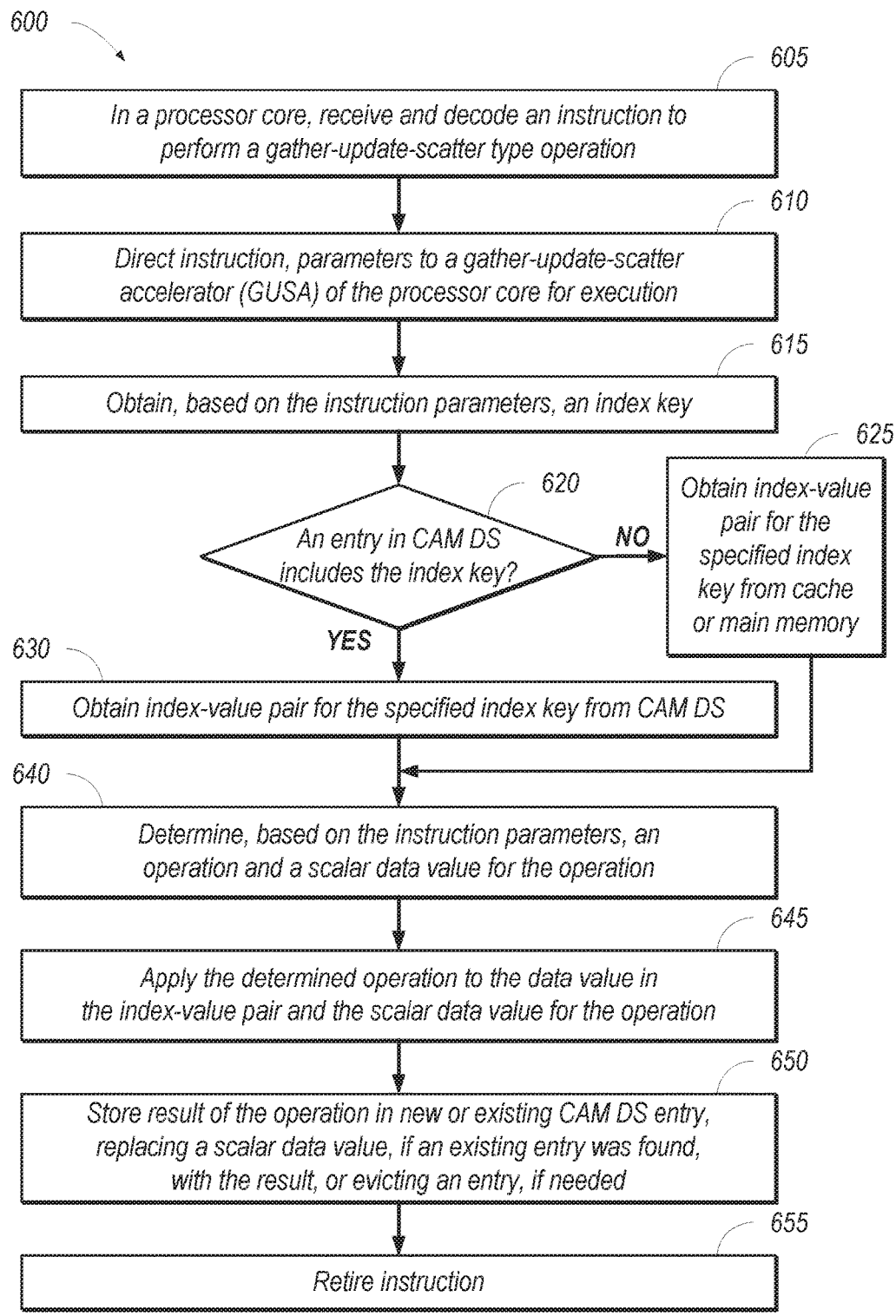
FIG. 6 is flow diagram illustrating a method for performing a gather-update-scatter operation by a gather-update-scatter accelerator of a processor, in accordance with some embodiments of the present disclosure.

FIG. 6 is flow diagram illustrating a method 600 for performing a gather-update-scatter operation by a gather-update-scatter accelerator of a processor, in accordance with some embodiments of the present disclosure. Method 600 may be implemented by any of the elements shown in FIGS. 1A-5 or 9A-16. Method 600 may be initiated by any suitable criteria and may initiate operation at any suitable point. In one embodiment, method 600 may initiate operation at 605. Method 600 may include greater or fewer steps than those illustrated or described below. Moreover, method 600 may execute its steps in an order different than those illustrated or described below. Method 600 may terminate at any suitable step. Moreover, method 600 may repeat operation at any suitable step. Method 600 may perform any of its steps in parallel with other steps of method 600, or in parallel with steps of other methods. Furthermore, method 600 may be executed multiple times to perform different gather-update-scatter operations, either sequentially or in parallel.

At 605, in one embodiment, an instruction to perform a gather-update-scatter type operation may be received and decoded by a processor core. At 610, the instruction and its parameters may be directed to a gather-update-scatter accelerator (GUSA) of the processor core for execution. At 615, based on the instruction parameters, an index key may be obtained. For example, in some embodiments, data representing the index key may be included in the instruction itself. In other embodiments, the instruction may include a pointer or other identifier of a location from which the index key can be obtained. Once the index key is obtained, it may be used as a search index for searching the CAM data structure for an entry that includes the matching key.

At 620, a determination may be made as to whether an entry in the CAM data structure includes the index key that was obtained at 615. If, at 620, it is determined that an entry in the CAM data structure includes the index key, method 600 may proceed to 630. Otherwise, method 600 may proceed to 625. At 625, an index-value pair including the specified index key may be obtained from a cache (e.g., a backing cache) or from main memory, after which method 600 may continue at 640. At 630, the index-value pair for the specified index key may be obtained from the CAM data structure, after which method 600 may continue at 640.

At 640, based on the instruction parameters, an operation to be performed and a scalar data value for the operation may be determined. For example, in some embodiments, data representing the operation to be performed may be included in the instruction itself. In other embodiments, the instruction may include a pointer or other identifier of a location from which data representing the operation to be performed can be obtained. Similarly, in some embodiments, the scalar data value may be included in the instruction itself. In other embodiments, the instruction may include a pointer or other identifier of a location from which the scalar data value can be obtained.

Once all of the instruction parameters have been obtained, at 645, the determined operation may be applied to the data value in the index-value pair stored in the CAM data structure entry and the scalar data value for the operation. At 650, the result of the operation may be stored in a new or existing CAM data structure entry. Storing the result may include replacing a scalar data value, if an existing entry including the index key was found, with the result, or evicting an entry, if needed. Subsequently, at 655, the gather-update-scatter instruction may be retired.

In various embodiments, any of a variety of automated or manually-applied replacement policies may be applied to select an entry in the CAM data structure whose contents are to be evicted to make room for a new entry. For example, in one embodiment, a Least Recently Used (LRU) replacement policy may specify that the least recently used value stored in the CAM data structure should be replaced with a new value. In other embodiments, the gather-update-scatter accelerator may support an explicit evict-store type instruction. In such embodiments, the instruction itself may explicitly specify a particular entry to be evicted, and its contents replaced, based on any criteria that is suitable for the particular application.

Figure 7:
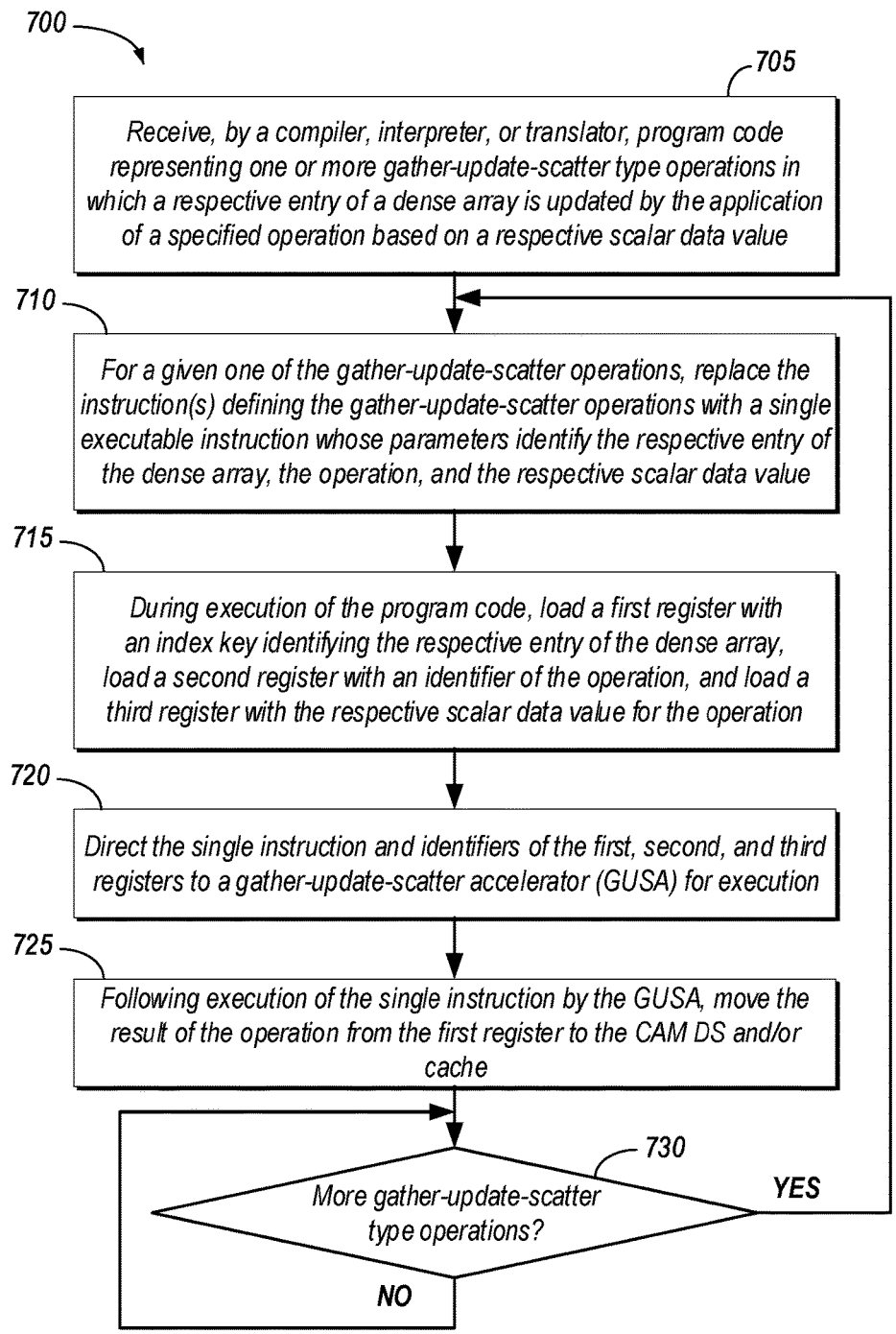
FIG. 7 is a flow diagram illustrating a method for using a gather-update-scatter accelerator to perform one or more gather-update-scatter operations, in accordance with some embodiments of the present disclosure.

FIG. 7 is a flow diagram illustrating a method 700 for using a gather-update-scatter accelerator to perform one or more gather-update-scatter operations, in accordance with some embodiments of the present disclosure. Method 700 may be implemented by any of the elements shown in FIGS. 1A-5 or 9A-16. Method 700 may be initiated by any suitable criteria and may initiate operation at any suitable point. In one embodiment, method 700 may initiate operation at 705. Method 700 may include greater or fewer steps than those illustrated or described below. Moreover, method 700 may execute its steps in an order different than those illustrated or described below. Method 700 may terminate at any suitable step. Moreover, method 700 may repeat operation at any suitable step. Method 700 may perform any of its steps in parallel with other steps of method 600, or in parallel with steps of other methods. Furthermore, method 700 may be executed multiple times to perform different gather-update-scatter operations, either sequentially or in parallel.

At 705, in some embodiments, program code representing one or more gather-update-scatter type operations in which a respective entry of a dense array is updated by the application of a specified operation based on a respective scalar data value may be received, by a compiler, interpreter, or translator. In such embodiments, at 710, for a given one of the gather-update-scatter operations, the instruction(s) defining the gather-update-scatter operations may be replaced with a single executable instruction whose parameters identify the respective entry of the dense array, the operation to be performed, and the respective scalar data value. In other embodiments, an instruction stream received by a processor may include data representing a single executable gather-update-scatter type instruction whose parameters and/or opcode identify the respective entry of the dense array, the operation to be performed, and the respective scalar data value, in which case the operations shown at 705 and 710 may be elided.

At 715, in some embodiments, during execution of the program code, a first register may be loaded with an index key identifying the respective entry of the dense array, a second register may be loaded with an identifier of the arithmetic or logic operation to be performed as part of the gather-update-scatter type operation, and a third register may be loaded with the respective scalar data value for the operation. In one example embodiment, each of these register loads may be performed by a respective decoded instruction (e.g., a uop) that was generated by a compiler, interpreter, or translator. In some embodiments, at 720, a representation of the decoded single instruction for the gather-update-scatter operation (e.g., a uop) and identifiers of the first, second, and third registers may be directed to a gather-update-scatter accelerator (GUSA) for execution. In other embodiments, the arithmetic or logic operation to be performed may be implicitly specified by the opcode of the gather-update-scatter type operation.

In some embodiments, at 725, following the execution of the single instruction by the GUSA, the result of the operation may be moved from the first register to the CAM data structure and/or to a cache (such as a backing cache). In some embodiments, this moving may be performed in multiple steps. For example, the result of the operation may initially be stored in the CAM data structure by an ALU or other circuitry or logic with the CAM control logic. The result may, subsequently, be copied (e.g., backed up) or evicted to the cache, after which it may eventually be flushed to main memory. If, at 730, there are more gather-update-scatter type operations in the program code to be executed, method 700 may return to 710, from which point it may repeat any or all of the operations shown as 710-725, as appropriate, for each of the additional gather-update-scatter type operations in the program code. While there are no additional gather-update-scatter type operations in the program code to be executed, there may be no further action taken by the dedicated gather-update-scatter accelerator.

While various mechanisms for accelerating gather-update-scatter type operations using a CAM-based gather-update-scatter accelerator have been described primarily in terms of scalar operations, in other embodiments, the operations performed by the gather-update-scatter accelerator may be extended vector operations, e.g., SIMD operations. In such embodiments, the instruction call may identify a vector register in which multiple indices are stored in different lanes, a register in which data identifying the arithmetic or logical operation to be performed is stored, and a vector register in which multiple scalar values to serve as respective additional operands for the operations are stored. In some such embodiments, the instruction set architecture may include dedicated mask registers for conditional execution and/or efficient merging of destination operands. At least some extended vector instructions for performing gather-update-scatter operations may include support for broadcasting. At least some extended vector instructions for performing gather-update-scatter operations may include support for embedded masking to enable predication. For example, in one embodiment, encodings of the extended vector instructions for performing gather-update-scatter operations may include an encoding identifying any of eight dedicated mask registers, k0-k7. Each bit of the identified mask register may govern the behavior of a vector operation as it is applied to a respective source vector element or destination vector element. For example, in one embodiment, seven of these mask registers (k1-k7) may be used to conditionally govern the per-data-element computational operation of an extended vector instruction. In this example, the operation is not performed for a given vector element if the corresponding mask bit is not set. In another embodiment, mask registers k1-k7 may be used to conditionally govern the per-element updates to the destination operand of an extended vector instruction. In this example, a given destination element is not updated with the result of the operation if the corresponding mask bit is not set.

In one embodiment, encodings of the extended vector instructions for performing gather-update-scatter operations may include an encoding specifying the type of masking to be applied to the destination (result) vector of an extended vector instruction. For example, this encoding may specify whether merging-masking or zero-masking is applied to the execution of a vector operation. If this encoding specifies merging-masking, the value of any destination vector element whose corresponding bit in the mask register is not set may be preserved in the destination vector. If this encoding specifies zero-masking, the value of any destination vector element whose corresponding bit in the mask register is not set may be replaced with a value of zero in the destination vector. In one example embodiment, mask register k0 is not used as a predicate operand for a vector operation. In this example, the encoding value that would otherwise select mask register k0 may instead select an implicit mask value of all ones, thereby effectively disabling masking. In this example, mask register k0 may be used for any instruction that takes one or more mask registers as a source or destination operand.

As described herein, a CAM-based gather-update-scatter accelerator may be used to accelerate the execution of gather-update-scatter type operations in a processor. These types of operations are used in the gradient update step in linear classifiers, as well as in other machine learning techniques that are in common use. Machine learning applications may account for a significant portion of the workload for data centers, and the techniques describe herein may provide an instruction set architecture with a large performance boost for these workloads. Other types of applications that may benefit from the use of these techniques include histogram calculations that include a large number of bins, or similar compute patterns that are common in high-performance computing.

As described in detail herein, a CAM-based gather-update-scatter accelerator may provide benefits over typical load/store based software implementations of these operations and over gather/scatter-based SIMD implementations. For example, in various embodiments, the CAM-based approach described herein for accelerating gather-update-scatter operations may allow a processor to perform multiple gather-update-scatter operations in one cycle even if there is no spatial locality, may reduce the number of cache accesses that would otherwise be required using existing approaches, may reduce the number of TLB look-ups that would otherwise be required using existing approaches, and/or may optimize storage for the low spatial locality case by reducing the size of the address field (e.g., through the use of indexed addressing) and the size of the value field of each CAM entry (e.g., by using 32 bits or 64 bits, rather than 64 bytes for this field, depending on what type of value is being operated on). In some embodiments, because of the parallel distribution of the frequency of use of these data structures, the hit rate in the CAM may be relatively high even though the CAM data structure itself does not store a large number of entries. For example, based on an initial evaluation of typical distributions within machine learning applications, a fairly high rate of hits inside the CAM data structure may be expected for at least these type of workloads.

The figures described below include detailed examples of architectures and systems to implement embodiments of the hardware components and/or instructions described above. In some embodiments, one or more hardware components and/or instructions described above may be emulated as described in detail below, or may be implemented as software modules.

Example Register Architecture

Figure 8:
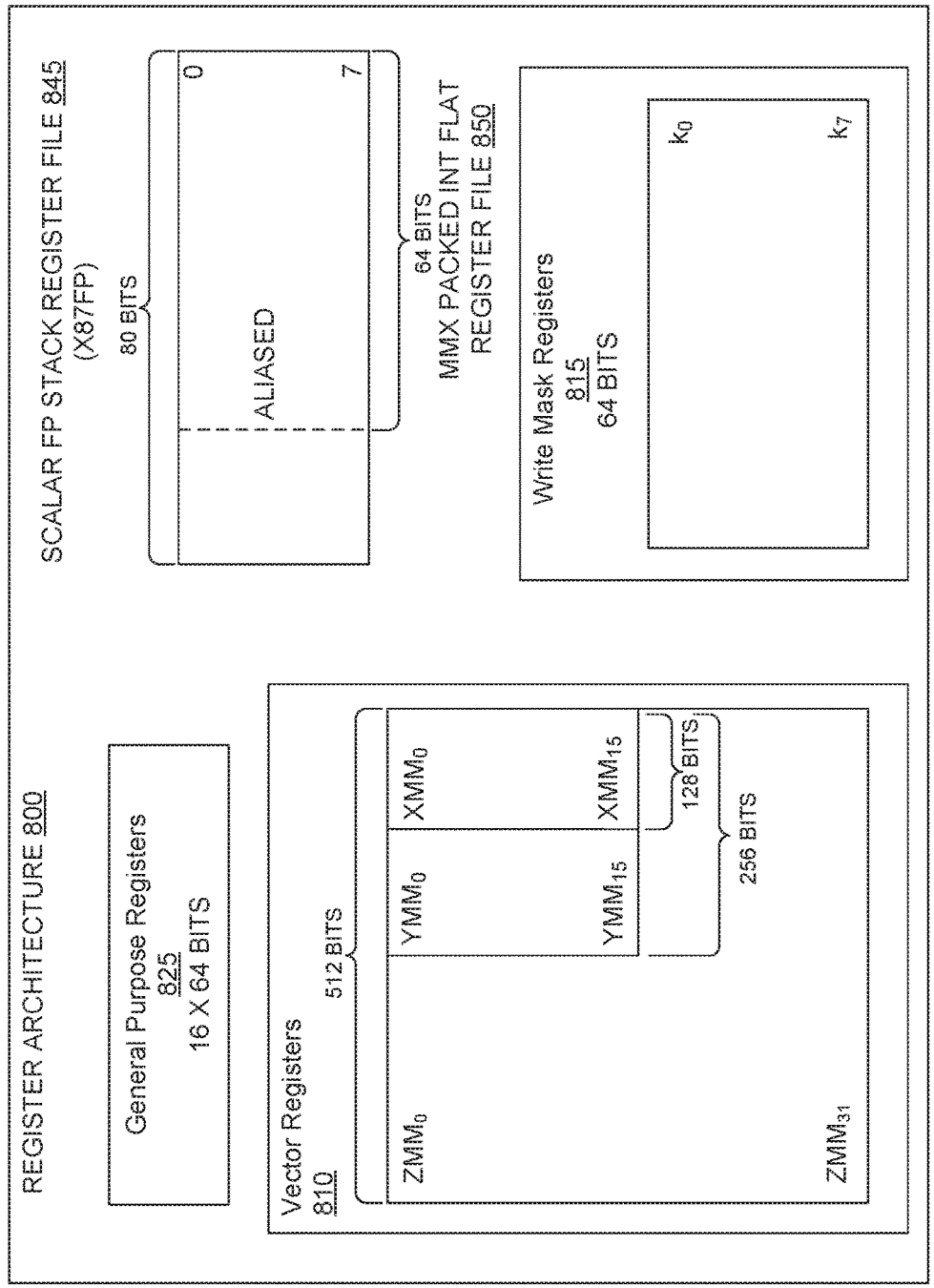
FIG. 8 is a block diagram illustrating a register architecture, according to some embodiments of the present disclosure.

FIG. 8 is a block diagram illustrating a register architecture 800, according to one embodiment. In the illustrated embodiment, there are 32 vector registers 810, each of which is 512 bits wide. In the description that follows, these registers are referenced as registers ZMM0 through ZMM31. As illustrated in FIG. 8, the lowest order 256 bits of the lower 16 ZMM registers are overlaid on registers YMM0 through YMM15. In addition, the lowest order 128 bits of the lower 16 ZMM registers (corresponding to the lowest order 128 bits of the YMM registers) are overlaid on registers XMM0 through XMM15. The specific vector friendly instruction format QAC00 operates on these overlaid register files as illustrated in the table below.

| Adjustable Vector Length | Class | Operations | Registers |
| --- | --- | --- | --- |
| Instruction Templates that do not include the vector length field QAB59B | A (Figure QABA; U = 0) | QAB10, QAB15, QAB25, QAB30 | ZMM registers (the vector length is 64 bytes) |
| | B (Figure QABB; U = 1) | QAB12 | ZMM registers (the vector length is 64 bytes) |
| Instruction templates that do include the vector length field QAB59B | B (Figure QABB; U = 1) | QAB17, QAB27 | ZMM, YMM, or XMM registers (the vector length is 64 bytes, 32 bytes, or 16 bytes, depending on the vector length field QAB59B) |

In other words, the vector length field QAB59B may be used to select between a maximum length for the vectors to be operated on and one or more other shorter lengths, where each such shorter length may be half the length of the preceding vector length option. Instructions defined using instruction templates that do not include the vector length field QAB59B may operate on vectors of the maximum vector length for the specified vector register. In one embodiment, instructions defined using the class B instruction templates of the specific vector friendly instruction format QAC00 may operate on packed or scalar single/ double-precision floating point data and packed or scalar integer data. Scalar operations may be performed on the lowest order data element position in a vector register (e.g., a ZMM, YMM, or XMMM register). In this case, the contents of the higher order data element positions of the vector register may be unchanged due to the execution of the instruction or may be zeroed out, in different embodiments.

In the illustrated embodiment, there are eight write mask registers 815 (referenced as write mask registers k0 through k7), each of which is 64 bits wide. In an alternate embodiment, the write mask registers 815 may be 16 bits wide. As previously described, in one embodiment, the vector mask register k0 cannot be used as a write mask. In this case, when an instruction includes an encoding that would normally indicate k0 is used for a write mask, a hardwired write mask of 0xFFFF may be applied instead, effectively disabling write masking for that instruction.

In the illustrated embodiment, there are sixteen 64-bit general-purpose registers 825 that are used along with the existing x86 addressing modes to address memory operands. These registers are referenced by the names RAX, RBX, RCX, RDX, RBP, RSI, RDI, RSP, and R8 through R15.

In the illustrated embodiment, register architecture 800 includes scalar floating point stack register file (e.g., an x87 floating point stack) 845, on which is aliased the MMX packed integer flat register file 850. As illustrated in this example embodiment, the x87 stack 845 may be an eight-element stack used to perform scalar floating point operations on 32-bit, 64-bit, and/or 80-bit floating point data using the x87 instruction set extension. In this example embodiment, the MMX registers are used to perform operations on 64-bit packed integer data, as well as to hold operands for some operations performed between the MMX and XMM registers. Alternative embodiments may include wider or narrower registers. Additionally, alternative embodiments may include more, fewer, or different register files and registers.

Example Core Architectures, Processors, and Computer Architectures

Processor cores may be implemented in different ways, for different purposes, and in different processors. For instance, in various embodiments, such cores may include a general purpose in-order core intended for general-purpose computing, a high-performance general purpose out-of-order core intended for general-purpose computing, and/or a special purpose core intended primarily for graphics and/or scientific computing (e.g., high throughput computing). In various embodiments, different processors may include a central processing unit (CPU), including one or more general purpose in-order cores intended for general-purpose computing and/or one or more general purpose out-of-order cores intended for general-purpose computing, and a coprocessor, including one or more special purpose cores intended primarily for graphics and/or scientific computing (e.g., high throughput computing). Such different processors may lead to different computer system architectures, in different embodiments. For example, in some embodiments, a coprocessor may be on a separate chip than a CPU. In other embodiments, a coprocessor may be on a separate die than a CPU, but may be in the same package as the CPU. In some embodiments, a coprocessor may be on the same die as a CPU. In this case, the coprocessor may sometimes be referred to as special purpose logic, which may include integrated graphics and/or scientific logic (e.g., high throughput logic), or as a special purpose core. In some embodiments, a system on a chip may include, on the same die, a CPU as described above (which may be referred to as the application core(s) or application processor(s)), a coprocessor as described above, and additional functionality. Example core architectures, processors, and computer architectures are described below, according to some embodiments.

Example Core Architectures

In-Order and Out-of-Order Core Block Diagram

Figure 9A:
FIG. 9A is a block diagram illustrating an in-order pipeline and a register renaming, out-of-order issue/execution pipeline, according to some embodiments of the present disclosure.
Figure 9B:
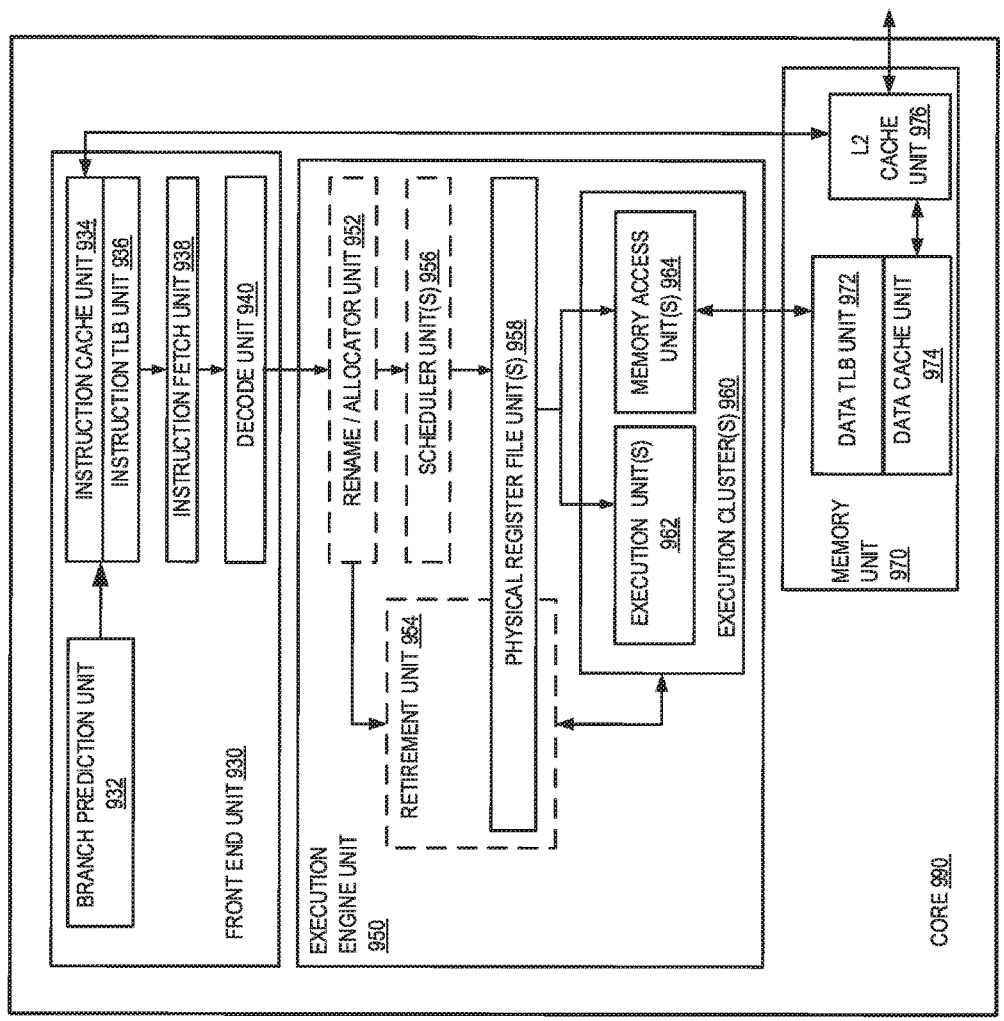
FIG. 9B is a block diagram illustrating an in-order architecture core and register renaming, out-of-order issue/execution logic to be included in a processor, according to some embodiments of the present disclosure.

FIG. 9A is a block diagram illustrating an example in-order pipeline and a register renaming, out-of-order issue/execution pipeline, according to some embodiments. FIG. 9B is a block diagram illustrating an in-order architecture core and register renaming, out-of-order issue/execution logic to be included in a processor, according to some embodiments. The solid lined boxes in FIG. 9A illustrate the in-order pipeline, while the dashed lined boxes illustrate the register renaming, out-of-order issue/execution pipeline. Similarly, the solid lined boxes in FIG. 9B illustrate the in-order architecture logic, while the dashed lined boxes illustrate the register renaming logic and out-of-order issue/execution logic.

In FIG. 9A, a processor pipeline 900 includes a fetch stage 902, a length decoding stage 904, a decode stage 906, an allocation stage 908, a renaming stage 910, a scheduling stage 912 (also known as a dispatch or issue stage), a register read/memory read stage 914, an execution stage 916, a write back/memory write stage 918, an exception handling stage 922, and a commit stage 924.

In FIG. 9B, arrows denote a coupling between two or more units and the direction of the arrow indicates a direction of data flow between those units. In this example, FIG. 9B illustrates a processor core 990 including a front end unit 930 coupled to an execution engine unit 950, both of which may be coupled to a memory unit 970. The core 990 may be a reduced instruction set computing (RISC) core, a complex instruction set computing (CISC) core, a very long instruction word (VLIW) core, or a core of a hybrid or alternative core type, in different embodiments. In various embodiments, core 990 may be a special-purpose core, such as, for example, a network core, a communication core, a compression engine, a coprocessor core, a general-purpose computing graphics processing unit (GPGPU) core, a graphics core, or another type of special-purpose core.

In this example, front end unit 930 includes a branch prediction unit 932 coupled to an instruction cache unit 934. Instruction cache unit 934 may be coupled to an instruction translation lookaside buffer (TLB) unit 936. TLB unit 936 may be coupled to an instruction fetch unit 938, which may be coupled to a decode unit 940. Decode unit 940 may decode instructions, and may generate as an output one or more micro-operations, micro-code entry points, microinstructions, other instructions, or other control signals, which are decoded from, or which otherwise reflect, or are derived from, the original undecoded instructions. Decode unit 940 may be implemented using any of a variety of suitable mechanisms, in different embodiments. Examples of suitable mechanisms may include, but are not limited to, look-up tables, hardware circuitry, programmable logic arrays (PLAs), microcode read only memories (ROMs). In one embodiment, instruction cache unit 934 may be further coupled to a level 2 (L2) cache unit 976 in memory unit 970. In one embodiment, the core 990 may include a microcode ROM or other medium that stores microcode for certain macroinstructions (e.g., within decode unit 940 or elsewhere within the front end unit 930). The decode unit 940 may be coupled to a rename/allocator unit 952 within the execution engine unit 950.

In this example, execution engine unit 950 includes the rename/allocator unit 952, which may be coupled to a retirement unit 954 and a set of one or more scheduler unit(s) 956. Scheduler unit(s) 956 may represent any number of different schedulers of various types, including those that implement reservation stations or those that implement a central instruction window. As illustrated in this example, scheduler unit(s) 956 may be coupled to physical register file unit(s) 958. Each of the physical register file units 958 may represent one or more physical register files, different ones of which store data of one or more different data types including, but not limited to, scalar integer, scalar floating point, packed integer, packed floating point, vector integer, vector floating point, or status data types. One example of the use of a status data type may be an instruction pointer that indicates the address of the next instruction to be executed. In one embodiment, a physical register file unit 958 may include a vector register unit, a write mask register unit, and a scalar register unit (not shown). These register units may provide architectural vector registers, write mask registers (e.g., vector mask registers), and general-purpose registers. In some embodiments, these registers may be similar to the registers illustrated in FIG. 8 and described above.

In FIG. 9B, the physical register file unit(s) 958 are shown as being overlapped by the retirement unit 954 to illustrate various ways in which register renaming and out-of-order execution may be implemented. For example, in different embodiments, register renaming and out-of-order execution may be implemented using one or more reorder buffers and one or more retirement register files; using one or more future files, one or more history buffers, and one or more retirement register files; or using register maps and a pool of registers. In general, the architectural registers may be visible from outside of the processor and/or from a programmer's perspective. The registers are not limited to any particular known type of circuit. Rather, any of a variety of different types of registers may be suitable for inclusion in core 990 as long as they store and provide data as described herein. Examples of suitable registers include, but are not limited to, dedicated physical registers, dynamically allocated physical registers using register renaming, and combinations of dedicated and dynamically allocated physical registers. In the example illustrated in FIG. 9B, retirement unit 954 and physical register file unit(s) 958 are coupled to the execution cluster(s) 960. Each of the execution clusters 960 may include a set of one or more execution units 962 and a set of one or more memory access units 964. Execution units 962 may perform various operations (e.g., shifts, addition, subtraction, multiplication) and may operate on various types of data (e.g., scalar floating point, packed integer, packed floating point, vector integer, vector floating point). While some embodiments may include a number of execution units dedicated to specific functions or sets of functions, other embodiments may include only one execution unit, or may include multiple execution units, all of which perform all supported functions or operations. In the example illustrated in FIG. 9B, scheduler unit(s) 956, physical register file unit(s) 958, and execution cluster(s) 960 are shown as potentially including a plurality of such units since some embodiments include separate pipelines for certain types of data/operations. For example, some embodiments may include a scalar integer pipeline, a scalar floating point/packed integer/packed floating point/vector integer/vector floating point pipeline, and/or a memory access pipeline, each of which includes its own scheduler unit, physical register file unit, and/or execution cluster. In some embodiments that include a separate memory access pipeline, only the execution cluster of this pipeline includes a memory access unit 964. It should also be understood that where separate pipelines are used, one or more of these pipelines may be out-of-order issue/execution pipelines and the rest may be in-order execution pipelines.

In the example illustrated in FIG. 9B, the set of memory access units 964 may be coupled to the memory unit 970, which includes a data TLB unit 972. Data TLB unit 972 may be coupled to a data cache unit 974, which in turn may be coupled to a level 2 (L2) cache unit 976. In one example embodiment, the memory access units 964 may include a load unit, a store address unit, and a store data unit, each of which may be coupled to the data TLB unit 972 in the memory unit 970. The L2 cache unit 976 may be coupled to one or more other levels of cache and, eventually, to a main memory. While FIG. 9B illustrates an embodiment in which instruction cache unit 934, data cache unit 974, and level 2 (L2) cache unit 976 reside within core 990, in other embodiments one or more caches or cache units may be internal to a core, external to a core, or apportioned internal to and external to a core in different combinations.

In one example embodiment, the register renaming, out-of-order issue/execution core architecture illustrated in FIG. 9B may implement pipeline 900 illustrated in FIG. 9A as follows. The instruction fetch unit 938 may perform the functions of the fetch and length decoding stages 902 and 904. The decode unit 940 may perform the functions of decode stage 906. The rename/allocator unit 952 may perform the functions of the allocation stage 908 and the renaming stage 910. The scheduler unit(s) 956 may perform the functions of the scheduling stage 912. The physical register file unit(s) 958 and the memory unit 970 may, collectively, perform the functions of the register read/memory read stage 914. The execution cluster(s) 960 may perform the functions of the execution stage 916. The memory unit 970 and the physical register file unit(s) 958 may, collectively, perform the functions of the write back/memory write stage 918. In different embodiments, various units (some of which may not be shown) may be involved in performing the functions of the exception handling stage 922. The retirement unit 954 and the physical register file unit(s) 958 may, collectively, perform the functions of the commit stage 924.

In different embodiments, core 990 may support one or more instruction sets, including the instruction(s) described herein. For example, in various embodiments, core 990 may support the x86 instruction set (with or without extensions that have been included in recent versions); the MIPS instruction set of MIPS Technologies of Sunnyvale, Calif.; and/or the ARM instruction set of ARM Holdings of Sunnyvale, Calif. (with or without optional additional extensions such as NEON. In one embodiment, core 990 may include logic to support a packed data instruction set extension (e.g., AVX1 or AVX2), thereby allowing the operations used by many multimedia applications to be performed using packed data.

In some embodiments, core 990 may support multithreading (e.g., executing two or more parallel sets of operations or threads), and may do so in a variety of ways. Core 990 may, for example, include support for time sliced multithreading, simultaneous multithreading (in which a single physical core provides a logical core for each of the threads that the physical core is simultaneously executing), or a combination of time sliced and simultaneous multithreading. In one embodiment, for example, core 990 may include support for time sliced fetching and decoding, and for simultaneous multithreading in subsequent pipeline stages, such as in the Intel® Hyperthreading technology.

While register renaming is described herein in the context of out-of-order execution, it should be understood that register renaming may be used in an in-order architecture, in some embodiments. While in the example embodiment illustrated in FIG. 9B, core 990 includes separate instruction and data cache units 934 and 974, respectively, and a shared L2 cache unit 976, in other embodiments core 990 may include a single internal cache for both instructions and data, such as, for example, a Level 1 (L1) internal cache, or multiple levels of internal cache. In some embodiments, the system may include a combination of an internal cache and an external cache (e.g., a cache that is external to the core and/or the processor). In other embodiments, all of the caches may be external to the core and/or the processor.

Specific Example in-Order Core Architecture

Figure 10B:
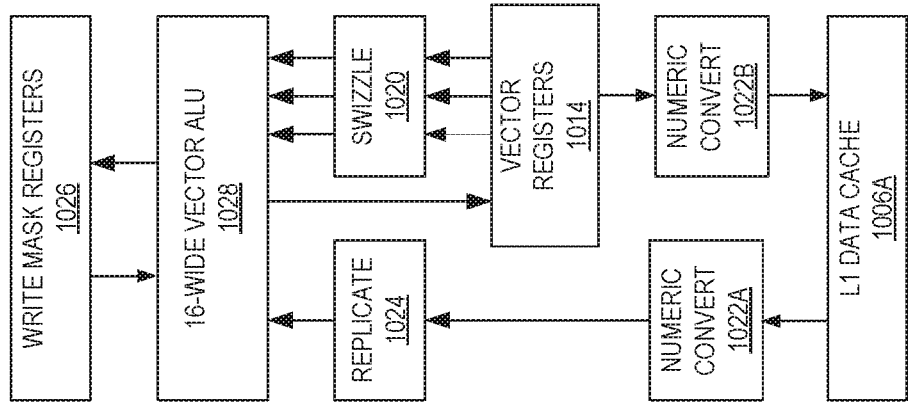
FIGS. 10A and 10B are block diagrams illustrating an example in-order core architecture, according to some embodiments of the present disclosure.
Figure 10A:
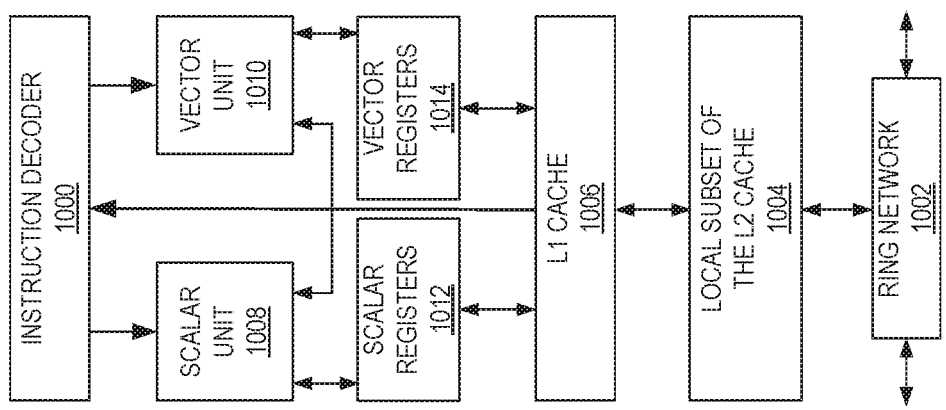

FIGS. 10A and 10B are block diagrams illustrating a more specific example of an in-order core architecture in which a core may be one of several logic blocks (including, for example, other cores of the same type and/or of different types) in a chip. As illustrated in this example, the logic blocks may communicate through a high-bandwidth, on-die interconnect network (e.g., a ring network) with some fixed function logic, memory I/O interfaces, and other necessary I/O logic, depending on the application.

FIG. 10A is a block diagram illustrating a single processor core, along with its connections to an on-die interconnect network (shown as ring network 1002) and to its local subset of a Level 2 (L2) cache 1004, according to some embodiments. In one embodiment, an instruction decoder 1000 may support the x86 instruction set with a packed data instruction set extension. An L1 cache 1006 may allow low-latency accesses to cache memory by the scalar and vector units. In one embodiment (e.g., to simplify the design), a scalar unit 1008 and a vector unit 1010 may use separate register sets (e.g., scalar registers 1012 and vector registers 1014, respectively) and data that is transferred between them may be written to memory and then read back in from level 1 (L1) cache 1006. However, other embodiments may use a different approach. For example, they may include a single register set or may include a communication path that allows data to be transferred between the two register files without being written to memory and read back.

In this example, the local subset of the L2 cache 1004 may be part of a global L2 cache that is divided into separate local subsets, e.g., with one subset per processor core. Each processor core may have a direct access path to its own local subset of the L2 cache 1004. Data read by a processor core may be stored in its subset of L2 cache 1004 from which it can be accessed quickly and in parallel with accesses by other processor cores to their own local L2 cache subsets. Data written by a processor core and stored in its own L2 cache subset may be flushed from other L2 cache subsets, if necessary. In some embodiments, the ring network 1002 may ensure coherency for shared data. The ring network may be bi-directional to allow agents such as processor cores, L2 caches and other logic blocks to communicate with each other within the chip. In one embodiment, each ring datapath may be 1012 bits wide per direction.

FIG. 10B illustrates an expanded view of part of the processor core illustrated in FIG. 10A, according to some embodiments. In this example, FIG. 10B includes an L1 data cache 1006A, which may be part of the L1 cache 1006, as well as more detail regarding the vector unit 1010 and the vector registers 1014. Specifically, the vector unit 1010 may be a 16-wide vector processing unit (VPU) that includes a 16-wide vector ALU 1028. ALU 1028 may be configured to execute one or more of integer, single-precision float, and double-precision float instructions. The VPU may also support swizzling the register inputs (using swizzle unit 1020), numeric conversion (using numeric convert units 1022A and 1022B), and replication (using replicate unit 1024) on the memory input. The inclusion of write mask registers 1026 may allow for predicating resulting vector writes.

Figure 11:
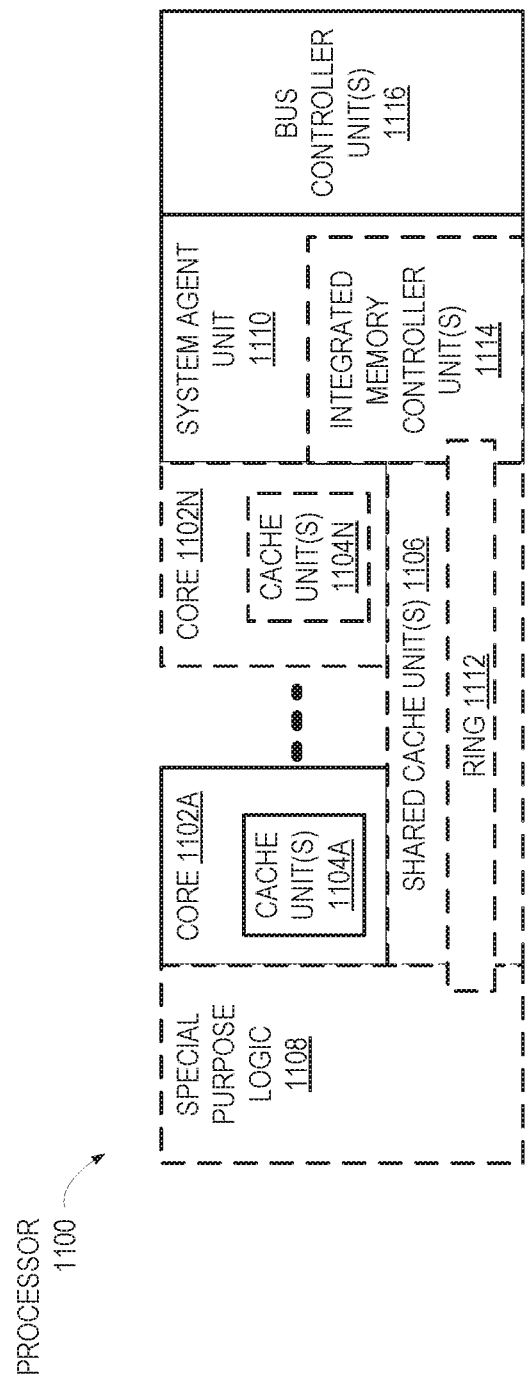
FIG. 11 illustrating a block diagram illustrating a processor, according to some embodiments of the present disclosure.

FIG. 11 is a block diagram illustrating a processor 1100 that, in some embodiments, may include more than one core, an integrated memory controller, and/or special purpose logic (such as for integrated graphics computing). The solid lined boxes in FIG. 11 illustrate a processor 1100 that includes a single core 1102A, a system agent 1110, and a set of one or more bus controller units 1116. With the optional addition of the dashed lined boxes, an alternative embodiment of processor 1100 includes multiple cores 1102A-1102N, and also includes a set of one or more integrated memory controller unit(s) 1114 within the system agent unit 1110, and special purpose logic 1108. In some embodiments, one or more of cores 1102A-1102N may be similar to processor core 990 illustrated in FIG. 9B or the processor core illustrated in FIGS. 10A and 10B.

In some embodiments, processor 1100 may represent a CPU in which the special purpose logic 1108 includes integrated graphics and/or scientific logic (which may include one or more cores), and in which the cores 1102A-1102N include one or more general purpose cores (e.g., general purpose in-order cores, general purpose out-of-order cores, or a combination of the two). In other embodiments, processor 1100 may represent a coprocessor in which the cores 1102A-1102N include a large number of special purpose cores intended primarily for graphics and/or scientific computing (e.g., high throughput computing). In still other embodiments, processor 1100 may represent a coprocessor in which the cores 1102A-1102N include a large number of general purpose in-order cores. Thus, in different embodiments, the processor 1100 may be a general purpose processor, a coprocessor, or a special purpose processor, such as, for example, a network or communication processor, compression engine, graphics processor, GPGPU (general purpose graphics processing unit), a high-throughput "many integrated core" (MIC) coprocessor (including, for example, 30 or more cores), an embedded processor, or another type of processor. The processor 1100 may be implemented on one chip or on more than one chip, in different embodiments. The processor 1100 may be a part of and/or may be implemented on one or more substrates using any of a number of process technologies, such as, for example, bipolar complementary metal oxide semiconductor (BiC-MOS), complementary metal oxide semiconductor (CMOS), or n-channel metal oxide semiconductor (NMOS).

In the example illustrated in FIG. 11, the memory hierarchy includes one or more levels of cache within each of the cores 1102A-1102N, shown as cache units 1104A-1104N, a set of one or more shared cache units 1106, and external memory (not shown), some or all of which are coupled to the set of integrated memory controller units 1114. The set of shared cache units 1106 may include one or more mid-level caches, such as level 2 (L2) cache, a level 3 (L3) cache, a level 4 (L4) cache, other levels of cache, a last level cache (LLC), and/or combinations thereof. In one embodiment, a ring based interconnect unit 1112 may be used to interconnect the special purpose logic 1108 (which may include integrated graphics logic), the set of shared cache units 1106, and the system agent unit 1110/integrated memory controller unit(s) 1114. In other embodiments, any number of other suitable techniques may be used for interconnecting such units. In one embodiment, coherency may be maintained between one or more shared cache units 1106 and cores 1102A-1102N.

In some embodiments, one or more of the cores 1102A-1102N may be capable of multithreading. In some embodiments, the system agent 1110 may include circuitry or logic for coordinating and operating cores 1102A-1102N. For example, the system agent unit 1110 may include a power control unit (PCU) and a display unit. The PCU may be or include logic and circuitry for regulating the power state of the cores 1102A-1102N and the special purpose logic 1108 (which may include integrated graphics logic). The display unit may include circuitry or logic for driving one or more externally connected displays.

In various embodiments, the cores 1102A-1102N may be homogenous or heterogeneous in terms of architecture instruction set. That is, two or more of the cores 1102A-1102N may be capable of executing the same instruction set, while others may be capable of executing only a subset of that instruction set or may execute a different instruction set.

Example Computer Architectures

Figure 12:
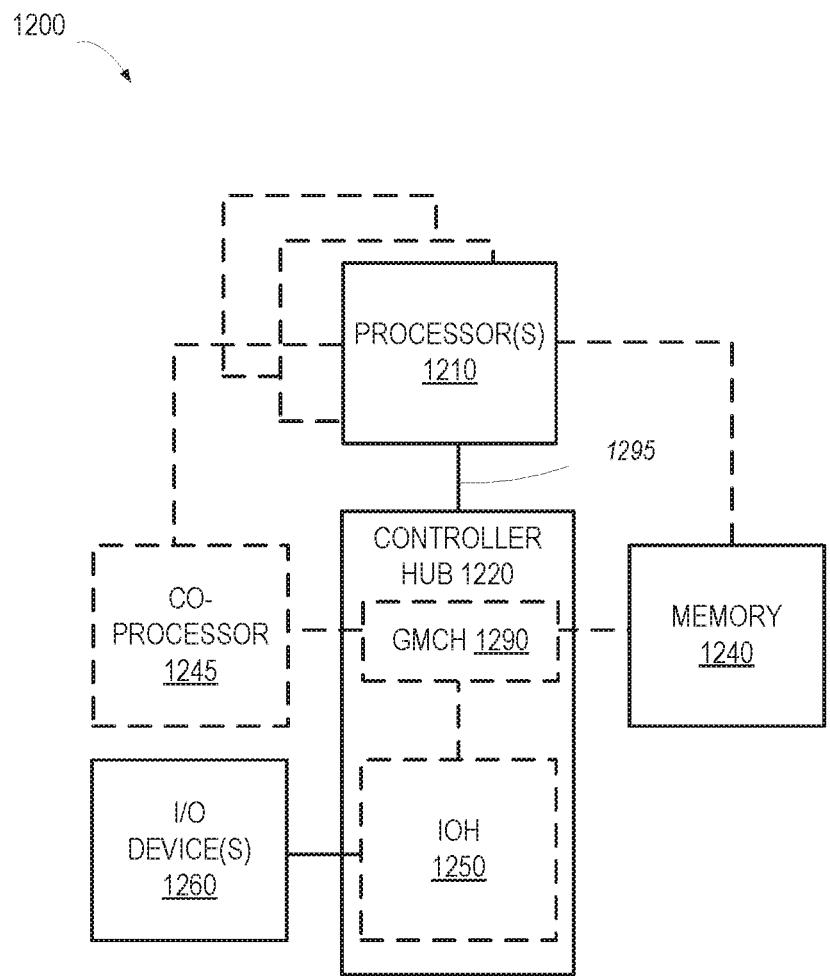
FIGS. 12 through 15 are block diagrams illustrating example computer architectures, according to some embodiments of the present disclosure.
Figure 13:
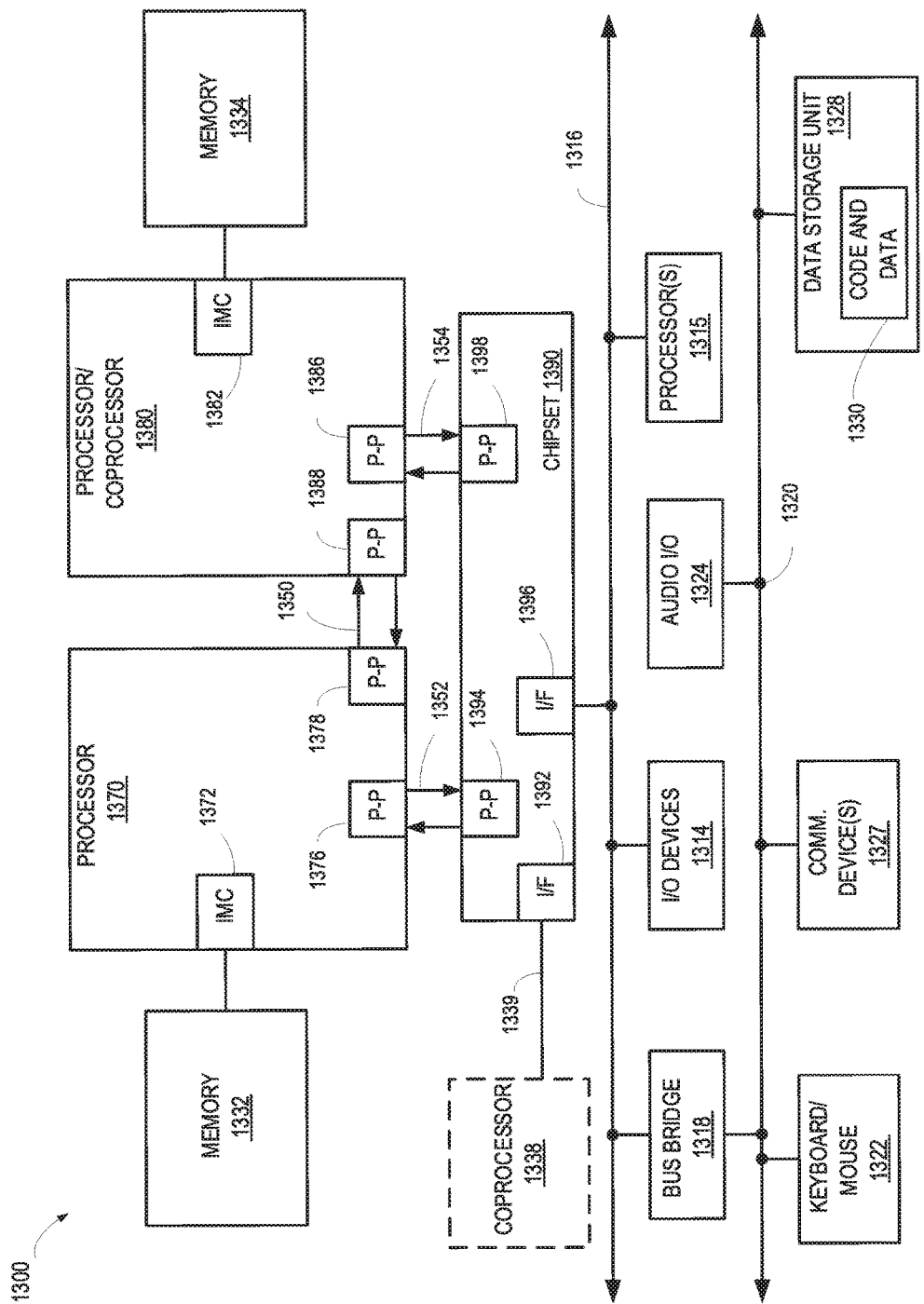
Figure 14:
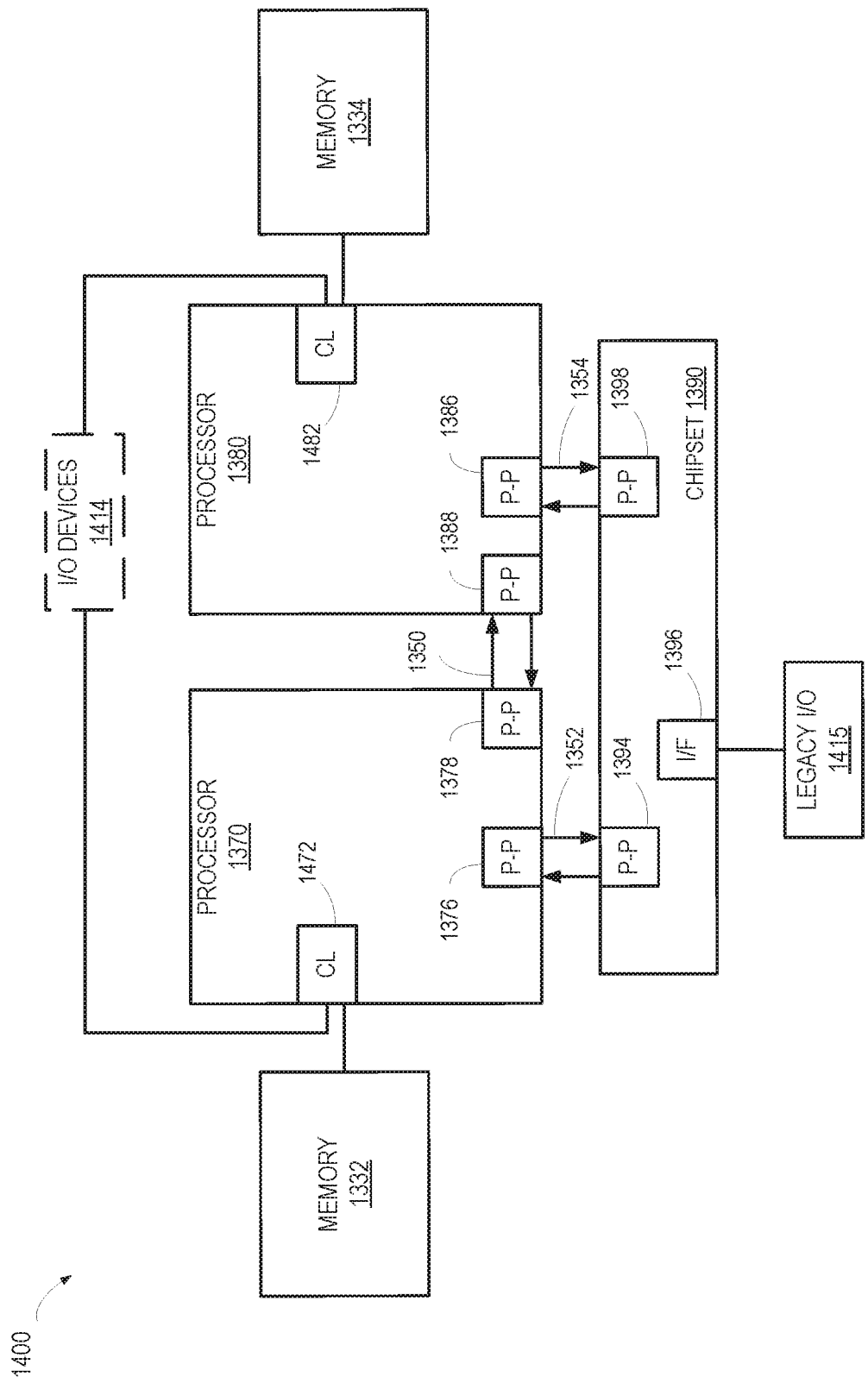
Figure 15:
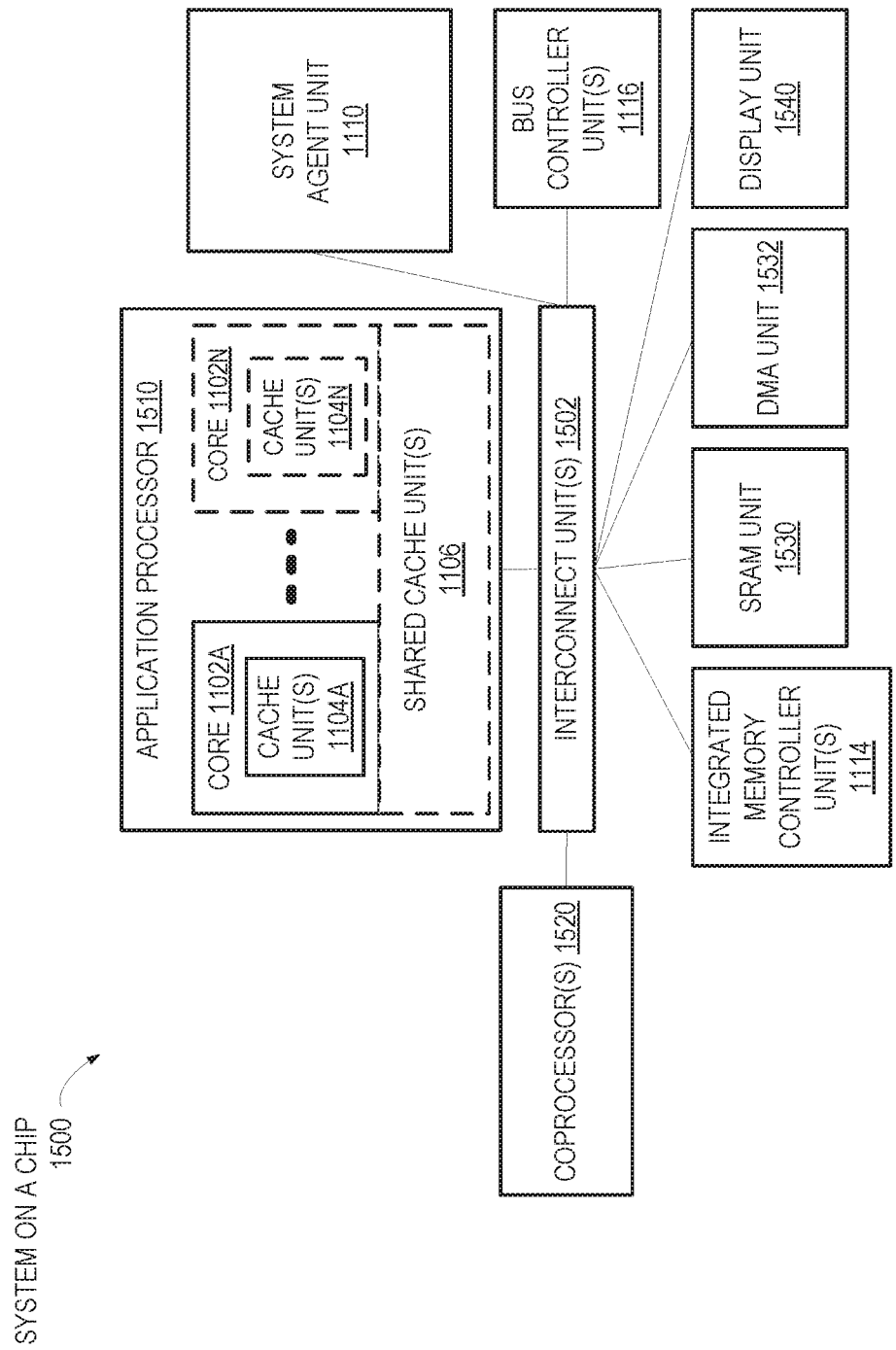

FIGS. 12 through 14 are block diagrams illustrating example systems suitable for the inclusion of one or more processors including, but not limited to, the processors described herein. FIG. 15 illustrates an example system on a chip (SoC) that may include one or more processor cores including, but not limited to, the processor cores described herein. Other system designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable for inclusion of the processors and/or processor cores described herein. In general, a huge variety of systems or electronic devices capable of incorporating a processor and/or other execution logic as disclosed herein are generally suitable for inclusion of the processors and/or processor cores described herein.

FIG. 12 is a block diagram illustrating a system 1200, in accordance with one embodiment of the present disclosure. As illustrated in this example, system 1200 may include one or more processors 1210, which are coupled to a controller hub 1220. In some embodiments, controller hub 1220 may include a graphics memory controller hub (GMCH) 1290 and an Input/Output Hub (IOH) 1250. In some embodiments, GMCH 1290 and IOH 1250 may be on separate chips. In this example, GMCH 1290 may include memory and graphics controllers (not shown) to which are coupled memory 1240 and a coprocessor 1245, respectively. In this example, IOH 1250 couples one or more input/output (I/O) devices 1260 to GMCH 1290. In various embodiments, one or both of the memory and graphics controllers may be integrated within the processor (as described herein), the memory 1240 and/or the coprocessor 1245 may be coupled directly to the processor(s) 1210, or the controller hub 1220 may be implemented in a single chip that includes the IOH 1250.

The optional nature of additional processors 1210 is denoted in FIG. 12 with broken lines. Each processor 1210 may include one or more of the processing cores described herein and may be implemented by a version of the processor 1100 illustrated in FIG. 11 and described herein.

In various embodiments, the memory 1240 may, for example, be dynamic random access memory (DRAM), phase change memory (PCM), or a combination of the two. In at least some embodiments, the controller hub 1220 may communicate with the processor(s) 1210 via a multi-drop bus such as a frontside bus (FSB), a point-to-point interface such as QuickPath Interconnect (QPI), or a similar connection, any one of which may be represented in FIG. 12 as interface 1295.

In one embodiment, the coprocessor 1245 may be a special purpose processor, such as, for example, a high-throughput MIC processor, a network or communication processor, a compression engine, a graphics processor, a GPGPU, an embedded processor, or another type of coprocessor. In one embodiment, controller hub 1220 may include an integrated graphics accelerator (not shown).

In some embodiments, there may be a variety of differences between the physical resources of different ones of the processors 1210. For example, there may be differences between the physical resources of the processors in terms of a spectrum of metrics of merit including architectural characteristics, micro-architectural characteristics, thermal characteristics, power consumption characteristics, and/or other performance-related characteristics.

In one embodiment, a processor 1210 may execute instructions that control data processing operations of a general type. Embedded within the instructions may be coprocessor instructions. The processor 1210 may recognize these coprocessor instructions as being of a type that should be executed by the attached coprocessor 1245. Accordingly, the processor 1210 may issue these coprocessor instructions (or control signals representing coprocessor instructions), on a coprocessor bus or other interconnect, to coprocessor 1245. Coprocessor(s) 1245 may accept and execute the received coprocessor instructions.

FIG. 13 is a block diagram illustrating a first example system 1300, in accordance with one embodiment of the present disclosure. As shown in FIG. 13, multiprocessor system 1300 implements a point-to-point interconnect system. For example, system 1300 includes a first processor 1370 and a second processor 1380 coupled to each other via a point-to-point interconnect 1350. In some embodiments, each of processors 1370 and 1380 may be a version of the processor 1100 illustrated in FIG. 11. In one embodiment, processors 1370 and 1380 may be implemented by respective processors 1210, while coprocessor 1338 may be implemented by a coprocessor 1245. In another embodiment, processors 1370 and 1380 may be implemented by a processor 1210 and a coprocessor 1245, respectively.

Processors 1370 and 1380 are shown including integrated memory controller (IMC) units 1372 and 1382, respectively. Processor 1370 also includes, as part of its bus controller units, point-to-point (P-P) interfaces 1376 and 1378. Similarly, processor 1380 includes P-P interfaces 1386 and 1388. Processors 1370 and 1380 may exchange information via a point-to-point (P-P) interface 1350 using P-P interface circuits 1378 and 1388. As shown in FIG. 13, IMCs 1372 and 1382 couple the processors to respective memories, shown as memory 1332 and memory 1334, which may be portions of a main memory that are locally attached to the respective processors.

Processors 1370 and 1380 may each exchange information with a chipset 1390 via individual P-P interfaces 1352 and 1354 respectively, using point to point interface circuits 1376, 1394, 1386, and 1398. Chipset 1390 may optionally exchange information with the coprocessor 1338 via interface 1392 over a high-performance interface 1339. In one embodiment, the coprocessor 1338 may be a special purpose processor, such as, for example, a high-throughput MIC processor, a network or communication processor, a compression engine, a graphics processor, a GPGPU, an embedded processor, or another type of special purpose processor. In one embodiment, coprocessor 1338 may include a high-performance graphics circuit and interface 1339 may be a high-performance graphics bus.

A shared cache (not shown) may be included in either processor or outside of both processors, yet may be connected with the processors via a P-P interconnect, such that either or both processors' local cache information may be stored in the shared cache if a processor is placed into a low power mode.

Chipset 1390 may be coupled to a first bus 1316 via an interface 1396. In various embodiments, first bus 1316 may be a Peripheral Component Interconnect (PCI) bus, a PCI Express bus, or another third generation I/O interconnect bus, although the scope of the present disclosure is not limited to these specific bus types.

As shown in FIG. 13, various I/O devices 1314 may be coupled to first bus 1316, along with a bus bridge 1318. Bus bridge 1318 may couple first bus 1316 to a second bus 1320. In one embodiment, one or more additional processor(s) 1315, such as one or more coprocessors, high-throughput MIC processors, GPGPU's, accelerators (e.g., graphics accelerators or digital signal processing (DSP) units), field programmable gate arrays, and/or any other processors, may be coupled to first bus 1316. In one embodiment, second bus 1320 may be a low pin count (LPC) bus. Various devices may be coupled to second bus 1320 including, for example, a keyboard and/or mouse 1322, one or more communication devices 1327 and a data storage unit 1328. Data storage unit 1328 may be a disk drive or another mass storage device, which may include instructions/code and data 1330, in one embodiment. In some embodiments, an audio I/O device 1324 may be coupled to the second bus 1320. Note that other architectures are possible. For example, instead of the point-to-point architecture illustrated in FIG. 13, a system may implement a multi-drop bus or another type of interconnect architecture.

FIG. 14 is a block diagram illustrating a second example system 1400, in accordance with one embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370 and 1380 may include integrated memory and I/O control logic ("CL") units 1472 and 1482, respectively. Thus, CL 1472 and CL 1482 may include integrated memory controller units and may also include I/O control logic. FIG. 14 illustrates that not only are the memories 1332 and 1334 coupled to CL 1472 and CL 1482, respectively, but I/O devices 1414 are also coupled to CL 1472 and CL 1482. In this example system, legacy I/O devices 1415 may also be coupled to the chipset 1390 via an interface 1396.

FIG. 15 is a block diagram illustrating a system on a chip (SoC) 1500, in accordance with one embodiment of the present disclosure. Similar elements in FIGS. 15 and 11 bear like reference numerals. Also, dashed lined boxes represent optional features on more advanced SoCs. In FIG. 15, one or more interconnect unit(s) 1502 are coupled to an application processor 1510, which includes a set of one or more cores 1102A-1102N, including respective local cache units 1104A-1104N, and shared cache unit(s) 1106. The interconnect unit(s) 1502 are also coupled to a system agent unit 1110, one or more bus controller unit(s) 1116, one or more integrated memory controller unit(s) 1114, a set of one or more coprocessors 1520, a static random access memory (SRAM) unit 1530, a direct memory access (DMA) unit 1532, and a display unit 1540 for coupling to one or more external displays. In one embodiment, the coprocessor(s) 1520 may include a special purpose processor, such as, for example, a network or communication processor, a compression engine, a GPGPU, a high-throughput MIC processor, an embedded processor, or another type of coprocessor. In another embodiment, the coprocessor(s) 1520 may be a media processor that includes integrated graphics logic, an image processor, an audio processor, and/or a video processor.

In various embodiments, the mechanisms disclosed herein may be implemented in hardware, software, firmware, or a combination of such implementation approaches. Some embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and to generate output information. The output information may be supplied to one or more output devices, in known fashion. For purposes of this disclosure, a processing system may include any system that includes a processor, such as, for example, a digital signal processor (DSP), a microcontroller, an application specific integrated circuit (ASIC), or a microprocessor.

In some embodiments, the program code may be implemented in a high level procedural or object oriented programming language to communicate with a processing system. The program code may also be implemented in assembly or machine language, in other embodiments. In fact, the mechanisms described herein are not limited in scope to any particular programming language. In general, the programming language may be a compiled language or an interpreted language.

One or more aspects of at least one embodiment may be implemented by representative instructions stored on a non-transitory, machine-readable medium which represents various logic within the processor. The representative instructions, when read by a machine, may cause the machine to fabricate logic to perform the techniques described herein. Such representative instructions, sometimes referred to as "IP cores", may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable memories (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off the processor.

Figure 16:
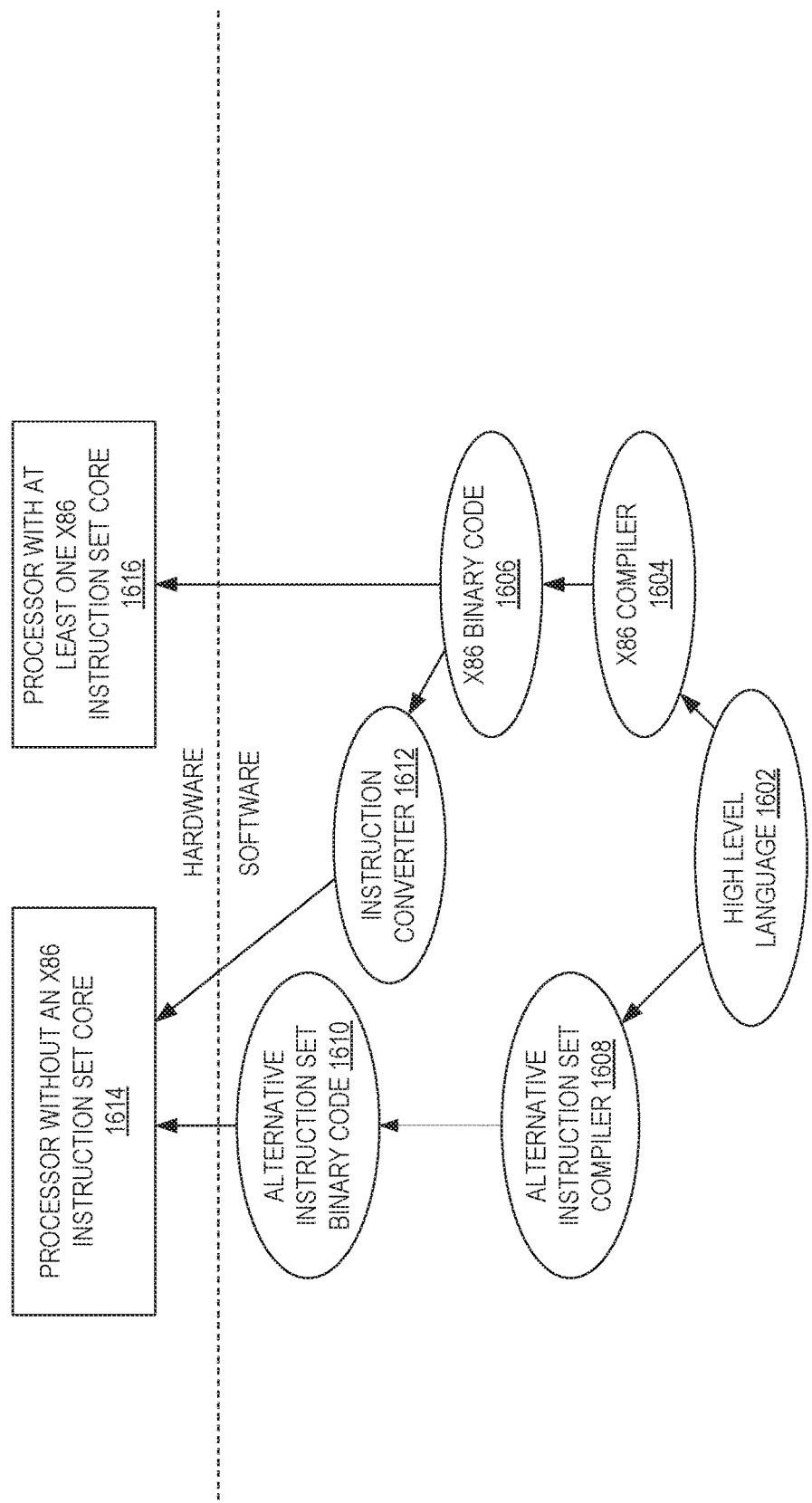
FIG. 16 is a block diagram illustrating the use of a compiler and a software instruction converter to convert binary instructions in a source instruction set to binary instructions in a target instruction set, according to some embodiments of the present disclosure.

FIG. 16 is a block diagram illustrating the use of a compiler and a software instruction converter to convert binary instructions in a source instruction set to binary instructions in a target instruction set, according to some embodiments. In the illustrated embodiment, the instruction converter may be a software instruction converter, although in other embodiments the instruction converter may be implemented in software, firmware, hardware, or various combinations thereof. FIG. 16 illustrates that a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that may perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that may be operable to generate x86 binary code 1606 (e.g., object code) that may, with or without additional linkage processing, be executed on the processor with at least one x86 instruction set core 1616. Similarly, FIG. 16 illustrates that the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1612 may be used to convert x86 binary code 1606 into code that may be natively executed by the processor without an x86 instruction set core 1614. This converted code might not be the same as the alternative instruction set binary code 1610; however, the converted code will accomplish the general operation and be made up of instructions from the alternative instruction set. Thus, instruction converter 1612 represents software, firmware, hardware, or a combination thereof that, through emulation, simulation or any other process, allows a processor or other electronic device that does not have an x86 instruction set processor or core to execute x86 binary code 1606.

Thus, techniques for performing one or more operations according to at least one embodiment are disclosed. While certain example embodiments have been described and shown in the accompanying drawings, it is to be understood that such embodiments are merely illustrative of and not restrictive of other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include a processor. In at least some of these embodiments, the processor may include a gather-update-scatter accelerator, and circuitry to direct an instruction to the gather-update-scatter accelerator for execution, the instruction including information to define a gather-update-scatter operation. The gather-update-scatter accelerator may include a content-addressable memory (CAM) including a plurality of entries, each of which stores a respective index key and a data value associated with the index key, and a CAM controller. The CAM controller may include circuitry to select, dependent on the information in the instruction, one of the plurality of entries in the CAM on which to operate, an arithmetic logic unit (ALU) including circuitry to perform an arithmetic or logical operation on the selected one of the plurality of entries in the CAM, the operation being dependent on the information in the instruction, and circuitry to store a result of the operation in the selected one of the plurality of entries in the CAM. In combination with any of the above embodiments, the information to define the gather-update-scatter operation may include data representing a given index key, data identifying the arithmetic or logical operation, and data representing an operand for the arithmetic or logical operation. In combination with any of the above embodiments, the information to define the gather-update-scatter operation may include an identifier of a register storing data representing a given index key, an identifier of a register storing data identifying the arithmetic or logical operation, and an identifier of a register storing data representing an operand for the arithmetic or logical operation. In combination with any of the above embodiments, the information to define the gather-update-scatter operation may include data representing a given index key, and the circuitry to select one of the plurality of entries in the CAM on which to operate may include circuitry to identify, based on the given index key, an entry in the CAM that includes the given index key. In combination with any of the above embodiments, the processor may further include a cache, the information to define the gather-update-scatter operation may include data representing a given index key, and the circuitry to select one of the plurality of entries in the CAM on which to operate may include circuitry to determine, based on a search of the CAM for the given index key, that no entry in the CAM includes the given index key, to obtain, from the cache, a key-value pair that includes the given index key, and to store the key-value pair obtained from the cache in the one of the plurality of entries in the CAM. In combination with any of the above embodiments, the processor may further include a cache, the information to define the gather-update-scatter operation may include data representing a given index key, and the circuitry to select one of the plurality of entries in the CAM on which to operate may include circuitry to determine, based on a search of the CAM for the given index key, that no entry in the CAM includes the given index key, to obtain, from the cache, a key-value pair that includes the given index key, to evict a key-value pair from the one of the plurality of entries in the CAM, and to store the key-value pair obtained from the cache in the one of the plurality of entries in the CAM. In combination with any of the above embodiments, the processor may further include a cache, and the CAM controller may further include circuitry to write the result of the operation to the cache as a key-value pair, the key-value pair including the result of the operation, and the given index key. In combination with any of the above embodiments, the information to define the gather-update-scatter operation may include data representing a scalar value for the arithmetic or logical operation, and to perform the operation, the ALU may include circuitry to perform the operation using a data value stored in the selected one of the plurality of entries in the CAM as a first operand and the data representing the scalar value as a second operand. In combination with any of the above embodiments, the ALU may be one of a plurality of arithmetic logic units in the CAM controller, each of which may include circuitry to perform a respective arithmetic or logical operation. In combination with any of the above embodiments, the ALU may be one of a plurality of arithmetic logic units in the CAM controller, at least one of which may include circuitry to perform a respective arithmetic or logical operation on another one of the plurality of entries in the CAM in parallel with performance of the arithmetic or logical operation the selected one of the plurality of entries in the CAM by the ALU. In combination with any of the above embodiments, the CAM may include a plurality of banks, the ALU may be one of a plurality of arithmetic logic units in the CAM controller, at least one of which may include circuitry to perform a respective arithmetic or logical operation on another one of the plurality of entries in the CAM in parallel with performance of the arithmetic or logical operation the selected one of the plurality of entries in the CAM by the ALU, and the other one of the plurality of entries in the CAM resides in a different bank in the CAM than the bank in which the selected one of the plurality of entries in the CAM resides. In combination with any of the above embodiments, the processor may further include a decoder to decode at least one undecoded instruction received by the processor in an instruction stream, and to direct the instruction to the gather-update-scatter accelerator for execution, the processor may include circuitry to receive a decoded instruction of the instruction set architecture of the processor from the decoder, and to direct the decoded instruction of the instruction set architecture of the processor to the gather-update-scatter accelerator for execution. In combination with any of the above embodiments, the processor may further include an interpreter or dynamic binary translator to generate one or more decoded instructions of the instruction set architecture of the processor for each of a plurality of undecoded instructions received by the processor in an instruction stream. To direct the instruction to the gather-update-scatter accelerator for execution, the processor may include circuitry to receive a decoded instruction of the instruction set architecture of the processor from the interpreter or dynamic binary translator, and to direct the decoded instruction of the instruction set architecture of the processor to the gather-update-scatter accelerator for execution.

Some embodiments of the present disclosure include a method. In at least some of these embodiments, the method may include, in a processor, directing an instruction to a gather-update-scatter accelerator for execution, the instruction including information to define a gather-update-scatter operation, the gather-update-scatter accelerator including a content-addressable memory (CAM) including a plurality of entries, each of which stores a respective index key and a data value associated with the index key, selecting, by the gather-update-scatter accelerator dependent on the information in the instruction, one of the plurality of entries in the CAM on which to operate, performing, by the gather-update-scatter accelerator, an arithmetic or logical operation on the selected one of the plurality of entries in the CAM, the operation being dependent on the information in the instruction, and storing a result of the operation in the selected one of the plurality of entries in the CAM. In combination with any of the above embodiments, the information to define the gather-update-scatter operation may include data representing a given index key, data identifying the arithmetic or logical operation, and data representing an operand for the arithmetic or logical operation. In combination with any of the above embodiments, the information to define the gather-update-scatter operation may include an identifier of a register storing data representing a given index key, an identifier of a register storing data identifying the arithmetic or logical operation, and an identifier of a register storing data representing an operand for the arithmetic or logical operation. In combination with any of the above embodiments, the information to define the gather-update-scatter operation may include data representing a given index key, and selecting one of the plurality of entries in the CAM on which to operate may include identifying, based on the given index key, an entry in the CAM that includes the given index key. In combination with any of the above embodiments, the processor may further include a cache, the information to define the gather-update-scatter operation may include data representing a given index key, and selecting one of the plurality of entries in the CAM on which to operate may include determining, based on a search of the CAM for the given index key, that no entry in the CAM includes the given index key, obtaining, from the cache, a key-value pair that includes the given index key, and storing the key-value pair obtained from the cache in the one of the plurality of entries in the CAM. In combination with any of the above embodiments, the processor may further include a cache, the information to define the gather-update-scatter operation may include data representing a given index key, and selecting one of the plurality of entries in the CAM on which to operate may include determining, based on a search of the CAM for the given index key, that no entry in the CAM includes the given index key, obtaining, from the cache, a key-value pair that includes the given index key, evicting a key-value pair from the one of the plurality of entries in the CAM, and storing the key-value pair obtained from the cache in the one of the plurality of entries in the CAM. In combination with any of the above embodiments, the processor may further include a cache, and the method may further include writing the result of the operation to the cache as a key-value pair, the key-value pair including the result of the operation, and the given index key. In combination with any of the above embodiments, the information to define the gather-update-scatter operation may include data representing a scalar value for the arithmetic or logical operation, and performing the operation may include performing the operation using a data value stored in the selected one of the plurality of entries in the CAM as a first operand and the data representing the scalar value as a second operand. In combination with any of the above embodiments, the gather-update-scatter accelerator may include an arithmetic logic unit (ALU), and performing the operation may include performing, by the ALU, the arithmetic or logical operation. In combination with any of the above embodiments, the gather-update-scatter accelerator may include a plurality of arithmetic logic units, and performing the operation may include performing, by a first one of the arithmetic logic units, a first arithmetic or logical operation on the selected one of the plurality of entries in the CAM in parallel with performance, by a second one of the arithmetic logic units, of a second arithmetic or logical operation on another one of the plurality of entries in the CAM. In combination with any of the above embodiments, the CAM may include a plurality of banks, the gather-update-scatter accelerator may include a plurality of arithmetic logic units, performing the operation may include performing, by a first one of the arithmetic logic units, a first arithmetic or logical operation on the selected one of the plurality of entries in the CAM in parallel with performance, by a second one of the arithmetic logic units, of a second arithmetic or logical operation on another one of the plurality of entries in the CAM, and the other one of the plurality of entries in the CAM resides in a different bank in the CAM than the bank in which the selected one of the plurality of entries in the CAM resides. In combination with any of the above embodiments, the processor may further include a decoder, and directing the instruction to the gather-update-scatter accelerator for execution may include receiving a decoded instruction of the instruction set architecture of the processor from the decoder, and directing the decoded instruction of the instruction set architecture of the processor to the gather-update-scatter accelerator for execution. In combination with any of the above embodiments, the processor may further include an interpreter or dynamic binary translator, and directing the instruction to the gather-update-scatter accelerator for execution may include receiving a decoded instruction of the instruction set architecture of the processor from the interpreter or dynamic binary translator, and directing the decoded instruction of the instruction set architecture of the processor to the gather-update-scatter accelerator for execution.

Some embodiments of the present disclosure include an accelerator. In at least some of these embodiments, the accelerator may include circuitry to receive an instruction for execution, the instruction including information to define a gather-update-scatter operation, a content-addressable memory (CAM) including a plurality of entries, each of which stores a respective index key and a data value associated with the index key, and a CAM controller. The CAM controller may include circuitry to select, dependent on the information in the instruction, one of the plurality of entries in the CAM on which to operate, an arithmetic logic unit (ALU) including circuitry to perform an arithmetic or logical operation on the selected one of the plurality of entries in the CAM, the operation being dependent on the information in the instruction, and circuitry to store a result of the operation in the selected one of the plurality of entries in the CAM. In combination with any of the above embodiments, the information to define the gather-update-scatter operation may include data representing a given index key, data identifying the arithmetic or logical operation, and data representing an operand for the arithmetic or logical operation. In combination with any of the above embodiments, the information to define the gather-update-scatter operation may include an identifier of a register storing data representing a given index key, an identifier of a register storing data identifying the arithmetic or logical operation, and an identifier of a register storing data representing an operand for the arithmetic or logical operation. In combination with any of the above embodiments, the information to define the gather-update-scatter operation may include data representing a given index key, and the circuitry to select one of the plurality of entries in the CAM on which to operate may include circuitry to identify, based on the given index key, an entry in the CAM that includes the given index key. In combination with any of the above embodiments, the information to define the gather-update-scatter operation may include data representing a given index key, and the circuitry to select one of the plurality of entries in the CAM on which to operate may include circuitry to determine, based on a search of the CAM for the given index key, that no entry in the CAM includes the given index key, to obtain, from a cache, a key-value pair that includes the given index key, and to store the key-value pair obtained from the cache in the one of the plurality of entries in the CAM. In combination with any of the above embodiments, the information to define the gather-update-scatter operation may include data representing a given index key, and the circuitry to select one of the plurality of entries in the CAM on which to operate may include circuitry to determine, based on a search of the CAM for the given index key, that no entry in the CAM includes the given index key, to obtain, from a cache, a key-value pair that includes the given index key, to evict a key-value pair from the one of the plurality of entries in the CAM, and to store the key-value pair obtained from the cache in the one of the plurality of entries in the CAM. In combination with any of the above embodiments, the CAM controller may further include circuitry to write the result of the operation to a cache as a key-value pair, the key-value pair including the result of the operation, and the given index key. In combination with any of the above embodiments, the information to define the gather-update-scatter operation may include data representing a scalar value for the arithmetic or logical operation, and to perform the operation, the ALU may include circuitry to perform the operation using a data value stored in the selected one of the plurality of entries in the CAM as a first operand and the data representing the scalar value as a second operand. In combination with any of the above embodiments, the ALU may be one of a plurality of arithmetic logic units in the CAM controller, each of which may include circuitry to perform a respective arithmetic or logical operation. In combination with any of the above embodiments, the ALU may be one of a plurality of arithmetic logic units in the CAM controller, at least one of which may include circuitry to perform a respective arithmetic or logical operation on another one of the plurality of entries in the CAM in parallel with performance of the arithmetic or logical operation on the selected one of the plurality of entries in the CAM by the ALU. In combination with any of the above embodiments, the CAM may include a plurality of banks, the ALU may be one of a plurality of arithmetic logic units in the CAM controller, at least one of which may include circuitry to perform a respective arithmetic or logical operation on another one of the plurality of entries in the CAM in parallel with performance of the arithmetic or logical operation on the selected one of the plurality of entries in the CAM by the ALU, and the other one of the plurality of entries in the CAM resides in a different bank in the CAM than the bank in which the selected one of the plurality of entries in the CAM resides. In combination with any of the above embodiments, to receive the instruction for execution, the accelerator may include circuitry to receive a decoded instruction from a decoder. In combination with any of the above embodiments, to receive the instruction for execution, the accelerator may include circuitry to receive a decoded instruction from an interpreter or dynamic binary translator.

Some embodiments of the present disclosure include a system. In at least some of these embodiments, the system may include means for directing an instruction to a gather-update-scatter accelerator for execution, the instruction including information to define a gather-update-scatter operation, the gather-update-scatter accelerator including a content-addressable memory (CAM) including a plurality of entries, each of which stores a respective index key and a data value associated with the index key, means for selecting, by the gather-update-scatter accelerator dependent on the information in the instruction, one of the plurality of entries in the CAM on which to operate, means for performing, by the gather-update-scatter accelerator, an arithmetic or logical operation on the selected one of the plurality of entries in the CAM, the operation being dependent on the information in the instruction, and means for storing a result of the operation in the selected one of the plurality of entries in the CAM. In combination with any of the above embodiments, the information to define the gather-update-scatter operation may include data representing a given index key, data identifying the arithmetic or logical operation, and data representing an operand for the arithmetic or logical operation. In combination with any of the above embodiments, the information to define the gather-update-scatter operation may include an identifier of a register storing data representing a given index key, an identifier of a register storing data identifying the arithmetic or logical operation, and an identifier of a register storing data representing an operand for the arithmetic or logical operation. In combination with any of the above embodiments, the information to define the gather-update-scatter operation may include data representing a given index key, and the means for selecting one of the plurality of entries in the CAM on which to operate may include means for identifying, based on the given index key, an entry in the CAM that includes the given index key. In combination with any of the above embodiments, the information to define the gather-update-scatter operation may include data representing a given index key, and the means for selecting one of the plurality of entries in the CAM on which to operate may include means for determining, based on a search of the CAM for the given index key, that no entry in the CAM includes the given index key, means for obtaining, from a cache, a key-value pair that includes the given index key, and means for storing the key-value pair obtained from the cache in the one of the plurality of entries in the CAM. In combination with any of the above embodiments, the information to define the gather-update-scatter operation may include data representing a given index key, and the means for selecting one of the plurality of entries in the CAM on which to operate may include means for determining, based on a search of the CAM for the given index key, that no entry in the CAM includes the given index key, means for obtaining, from a cache, a key-value pair that includes the given index key, means for evicting a key-value pair from the one of the plurality of entries in the CAM, and means for storing the key-value pair obtained from the cache in the one of the plurality of entries in the CAM. In combination with any of the above embodiments, the system may further include means for writing the result of the operation to a cache as a key-value pair, the key-value pair including the result of the operation, and the given index key. In combination with any of the above embodiments, the information to define the gather-update-scatter operation may include data representing a scalar value for the arithmetic or logical operation, and the means for performing the operation may include means for performing the operation using a data value stored in the selected one of the plurality of entries in the CAM as a first operand and the data representing the scalar value as a second operand. In combination with any of the above embodiments, the gather-update-scatter accelerator may include an arithmetic logic unit (ALU), and the means for performing the operation may include means for performing, by the ALU, the arithmetic or logical operation. In combination with any of the above embodiments, the gather-update-scatter accelerator may include a plurality of arithmetic logic units, and the means for performing the operation may include means for performing, by a first one of the arithmetic logic units, a first arithmetic or logical operation on the selected one of the plurality of entries in the CAM in parallel with performance, by a second one of the arithmetic logic units, of a second arithmetic or logical operation on another one of the plurality of entries in the CAM. In combination with any of the above embodiments, the CAM may include a plurality of banks, the gather-update-scatter accelerator may include a plurality of arithmetic logic units, and the means for performing the operation may include means for performing, by a first one of the arithmetic logic units, a first arithmetic or logical operation on the selected one of the plurality of entries in the CAM in parallel with performance, by a second one of the arithmetic logic units, of a second arithmetic or logical operation on another one of the plurality of entries in the CAM. The other one of the plurality of entries in the CAM resides in a different bank in the CAM than the bank in which the selected one of the plurality of entries in the CAM resides. In combination with any of the above embodiments, the means for directing the instruction to the gather-update-scatter accelerator for execution may include means for receiving a decoded instruction from a decoder, and means for directing the decoded instruction to the gather-update-scatter accelerator for execution. In combination with any of the above embodiments, the means for directing the instruction to the gather-update-scatter accelerator for execution may include means for receiving a decoded instruction from an interpreter or dynamic binary translator, and means for directing the decoded instruction to the gather-update-scatter accelerator for execution.

Some embodiments of the present disclosure include at least one non-transitory machine readable storage medium, including computer-executable instructions stored on the machine readable medium, the instructions readable by a processor. In at least some of these embodiments, the instructions may include a first instruction, when read and executed, for causing the processor to select, dependent on information in the first instruction, one of a plurality of entries in a content-addressable memory (CAM) on which to operate, the CAM including a plurality of entries, each of which stores a respective index key and a data value associated with the index key; to perform, by a dedicated arithmetic logic unit (ALU) associated with the CAM, an arithmetic or logical operation on the selected one of the plurality of entries in the CAM, the operation being dependent on the information in the first instruction; and to store a result of the operation in the selected one of the plurality of entries in the CAM. In any of the above embodiments, the information included in the first instruction may include data representing a given index key, data identifying the arithmetic or logical operation, and data representing an operand for the arithmetic or logical operation. In any of the above embodiments, the information included in the first instruction may include an identifier of a register storing data representing a given index key, an identifier of a register storing data identifying the arithmetic or logical operation, and an identifier of a register storing data representing an operand for the arithmetic or logical operation. In combination with any of the above embodiments, the information included in the first instruction may include data representing a given index key, and selecting one of the plurality of entries in the CAM on which to operate may include identifying, based on the given index key, an entry in the CAM that includes the given index key. In combination with any of the above embodiments, the information included in the first instruction may include data representing a given index key, and selecting one of the plurality of entries in the CAM on which to operate may include determining, based on a search of the CAM for the given index key, that no entry in the CAM includes the given index key, obtaining, from a cache, a key-value pair that includes the given index key, and storing the key-value pair obtained from the cache in the one of the plurality of entries in the CAM. In combination with any of the above embodiments, the information included in the first instruction may include data representing a given index key, and selecting one of the plurality of entries in the CAM on which to operate may include determining, based on a search of the CAM for the given index key, that no entry in the CAM includes the given index key, obtaining, from a cache, a key-value pair that includes the given index key, evicting a key-value pair from the one of the plurality of entries in the CAM, and storing the key-value pair obtained from the cache in the one of the plurality of entries in the CAM. In combination with any of the above embodiments, the first instruction may cause the processor to write the result of the operation to a cache as a key-value pair, and the key-value pair may include the result of the operation and the given index key. In combination with any of the above embodiments, the information included in the first instruction may include data representing a scalar value for the arithmetic or logical operation, and performing the operation may include the ALU performing the operation using a data value stored in the selected one of the plurality of entries in the CAM as a first operand and the data representing the scalar value as a second operand. In combination with any of the above embodiments, the instructions may include a second instruction for causing the processor to evict a first key-value pair from a given one of the plurality of entries in the CAM, the given one of the plurality of entries being identified based on a parameter of the second instruction, and to store a second key-value pair in the given one of the plurality of entries in the CAM.

What is claimed is:

1. A processor, comprising:
a gather-update-scatter accelerator; and
an allocator comprising circuitry to direct an instruction to the gather-update-scatter accelerator for execution, the instruction comprising information to define a gather-update-scatter operation;
wherein the gather-update-scatter accelerator comprises:
a content-addressable memory (CAM) comprising a plurality of entries, each of which stores a respective index key and a data value associated with the index key; and
a CAM controller comprising circuitry, the CAM controller configured to:
select, dependent on the information in the instruction, one of the plurality of entries in the CAM on which to operate;
perform an arithmetic or logical operation on the selected one of the plurality of entries in the CAM, the operation being dependent on the information in the instruction; and
store a result of the operation in the selected one of the plurality of entries in the CAM.

2. The processor of claim 1, wherein:
the information to define the gather-update-scatter operation comprises data representing a given index key; and
the CAM controller is further configured to select one of the plurality of entries in the CAM by:
identifying, based on the given index key, an entry in the CAM that includes the given index key.

3. The processor of claim 1, wherein:
the processor further comprises a cache;
the information to define the gather-update-scatter operation comprises data representing a given index key; and
the CAM controller is further configured to select one of the plurality of entries in the CAM by:
determining, based on a search of the CAM for the given index key, that no entry in the CAM includes the given index key;
obtaining, from the cache, a key-value pair that includes the given index key; and
storing the key-value pair obtained from the cache in the one of the plurality of entries in the CAM.

4. The processor of claim 1, wherein:
the processor further comprises a cache; and
the CAM controller is further configured to store the result of the operation by writing the result to a cache as a key-value pair, the key-value pair comprising:
the result of the operation; and
the given index key.

5. The processor of claim 1, wherein:
the information to define the gather-update-scatter operation comprises data representing a scalar value for the arithmetic or logical operation;
the CAM controller comprises an arithmetic logic unit (ALU); and
the ALU comprises circuitry to perform the operation using a data value stored in the selected one of the plurality of entries in the CAM as a first operand and the data representing the scalar value as a second operand.

6. The processor of claim 1, wherein:
the CAM controller comprises an arithmetic logic unit (ALU); and
the ALU is one of a plurality of arithmetic logic units in the CAM controller, at least one of which comprises circuitry to perform a respective arithmetic or logical operation on another one of the plurality of entries in the CAM in parallel with performance of the arithmetic or logical operation on the selected one of the plurality of entries in the CAM by the ALU.

7. The processor of claim 1, wherein:
the CAM comprises a plurality of banks;
the CAM controller comprises an arithmetic logic unit (ALU);
the ALU is one of a plurality of arithmetic logic units in the CAM controller, at least one of which includes circuitry to perform a respective arithmetic or logical operation on another one of the plurality of entries in the CAM in parallel with performance of the arithmetic or logical operation on the selected one of the plurality of entries in the CAM by the ALU; and the other one of the plurality of entries in the CAM resides in a different bank in the CAM than the bank in which the selected one of the plurality of entries in the CAM resides.

8. A method, comprising, in a processor:
directing an instruction to a gather-update-scatter accelerator for execution, the instruction comprising information to define a gather-update-scatter operation, the gather-update-scatter accelerator comprising a content-addressable memory (CAM) comprising a plurality of entries, each of which stores a respective index key and a data value associated with the index key;
selecting, by the gather-update-scatter accelerator dependent on the information in the instruction, one of the plurality of entries in the CAM on which to operate;
performing, by the gather-update-scatter accelerator, an arithmetic or logical operation on the selected one of the plurality of entries in the CAM, the operation being dependent on the information in the instruction; and
storing a result of the operation in the selected one of the plurality of entries in the CAM.

9. The method of claim 8, wherein:
the information to define the gather-update-scatter operation comprises data representing a given index key; and
selecting one of the plurality of entries in the CAM on which to operate comprises:
identifying, based on the given index key, an entry in the CAM that includes the given index key.

10. The method of claim 8, wherein:
the processor further comprises a cache;
the information to define the gather-update-scatter operation comprises data representing a given index key; and
selecting one of the plurality of entries in the CAM on which to operate comprises:
determining, based on a search of the CAM for the given index key, that no entry in the CAM includes the given index key;
obtaining, from the cache, a key-value pair that includes the given index key; and
storing the key-value pair obtained from the cache in the one of the plurality of entries in the CAM.

11. The method of claim 8, wherein:
the information to define the gather-update-scatter operation comprises data representing a scalar value for the arithmetic or logical operation; and
performing the operation comprises performing the operation using a data value stored in the selected one of the plurality of entries in the CAM as a first operand and the data representing the scalar value as a second operand.

12. The method of claim 8, wherein:
the gather-update-scatter accelerator comprises a plurality of arithmetic logic units; and
performing the operation comprises performing, by a first one of the arithmetic logic units, a first arithmetic or logical operation on the selected one of the plurality of entries in the CAM in parallel with performance, by a second one of the arithmetic logic units, of a second arithmetic or logical operation on another one of the plurality of entries in the CAM.

13. The method of claim 8, wherein:
the CAM comprises a plurality of banks;
the gather-update-scatter accelerator comprises a plurality of arithmetic logic units;
performing the operation comprises performing, by a first one of the arithmetic logic units, a first arithmetic or logical operation on the selected one of the plurality of entries in the CAM in parallel with performance, by a second one of the arithmetic logic units, of a second arithmetic or logical operation on another one of the plurality of entries in the CAM; and
the other one of the plurality of entries in the CAM resides in a different bank in the CAM than the bank in which the selected one of the plurality of entries in the CAM resides.

14. An accelerator, comprising:
a content-addressable memory (CAM) comprising a plurality of entries, each of which stores a respective index key and a data value associated with the index key; and
a CAM controller comprising circuitry, the CAM controller configured to:
select, dependent on information in an instruction defining a gather-update-scatter operation, one of the plurality of entries in the CAM on which to operate;
perform an arithmetic or logical operation on the selected one of the plurality of entries in the CAM, the operation being dependent on the information in the instruction; and
store a result of the operation in the selected one of the plurality of entries in the CAM.

15. The accelerator of claim 14, wherein:
the information to define the gather-update-scatter operation comprises data representing a given index key; and
the CAM controller is further configured to select one of the plurality of entries in the CAM by:
identifying, based on the given index key, an entry in the CAM that includes the given index key.

16. The accelerator of claim 14, wherein:
the information to define the gather-update-scatter operation comprises data representing a given index key; and
the CAM controller circuitry is further configured to select one of the plurality of entries in the CAM by:
determining, based on a search of the CAM for the given index key, that no entry in the CAM includes the given index key;
obtaining, from a cache, a key-value pair that includes the given index key; and
storing the key-value pair obtained from the cache in the one of the plurality of entries in the CAM.

17. The accelerator of claim 14, wherein:
the CAM controller circuitry is further configured to store the result of the operation by writing the result to a cache as a key-value pair, the key-value pair comprising:
the result of the operation; and
the given index key.

18. The accelerator of claim 14, wherein:
the information to define the gather-update-scatter operation comprises data representing a scalar value for the arithmetic or logical operation; and
the CAM controller comprises an arithmetic logic unit (ALU), and the ALU comprises circuitry to perform the operation using a data value stored in the selected one of the plurality of entries in the CAM as a first operand and the data representing the scalar value as a second operand.

19. The accelerator of claim 14, wherein:
the CAM controller comprises an arithmetic logic unit (ALU); and
the ALU is one of a plurality of arithmetic logic units in the CAM controller, at least one of which comprises circuitry to perform a respective arithmetic or logical operation on another one of the plurality of entries in the CAM in parallel with performance of the arithmetic or logical operation on the selected one of the plurality of entries in the CAM by the ALU.

20. The accelerator of claim 14, wherein:

the CAM comprises a plurality of banks;

the CAM controller comprises an arithmetic logic unit (ALU);

the ALU is one of a plurality of arithmetic logic units in the CAM controller, at least one of which comprises circuitry to perform a respective arithmetic or logical operation on another one of the plurality of entries in the CAM in parallel with performance of the arithmetic or logical operation on the selected one of the plurality of entries in the CAM by the ALU; and the other one of the plurality of entries in the CAM resides in a different bank in the CAM than the bank in which the selected one of the plurality of entries in the CAM resides.

\* \* \* \* \*